United States Patent [19]
Sato

[11] Patent Number: 6,038,081
[45] Date of Patent: Mar. 14, 2000

[54] ZOOM LENS HAVING PLASTIC LENS IN FIRST LENS GROUP

[75] Inventor: Hiroshi Sato, Hachioji, Japan

[73] Assignee: Konica Corporation, Tokyo, Japan

[21] Appl. No.: 09/074,590

[22] Filed: May 8, 1998

[30] Foreign Application Priority Data

May 9, 1997 [JP] Japan ................................. 9-119331
May 9, 1997 [JP] Japan ................................. 9-119332

[51] Int. Cl.⁷ .................................................. G02B 15/14
[52] U.S. Cl. .......................... 359/676; 359/686; 359/689
[58] Field of Search ........................... 359/676, 686–690

[56] References Cited

U.S. PATENT DOCUMENTS 4,582,399  4/1986  Mihara ................................. 350/427
5,546,231  8/1996  Sato et al. ........................... 359/687

FOREIGN PATENT DOCUMENTS 57-53718   3/1982   Japan .
59-13211   1/1984   Japan .
5-264902  10/1993   Japan .
6-34882    2/1994   Japan .
8-106046   4/1996   Japan .

*Primary Examiner*—Georgia Epps
*Assistant Examiner*—Suzanne Letendre
*Attorney, Agent, or Firm*—Finnegan, Henderson, Farabow, Garrett & Dunner, L.L.P.

[57] ABSTRACT

A zoom lens having a plurality of lens groups, includes: a first lens group including a plurality of lenses, provided closest to an object side, wherein a first lens made of a plastic lens having a positive refracting power is located closest to the object side among the plurality of lenses in the first lens group.

19 Claims, 20 Drawing Sheets

L1　L2　L3　L4

FIG. 2 (a) - 1    FIG. 2 (a) - 2    FIG. 2 (a) - 3
W
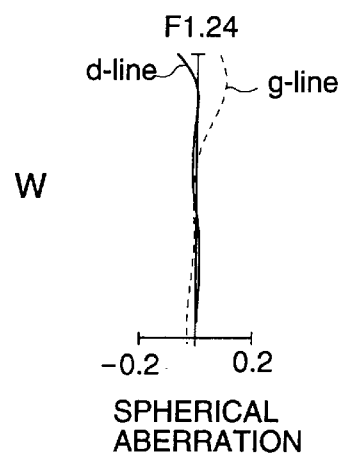 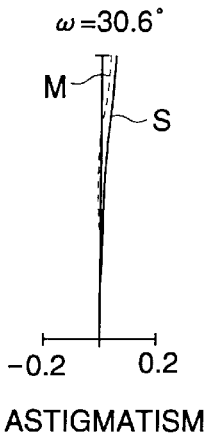 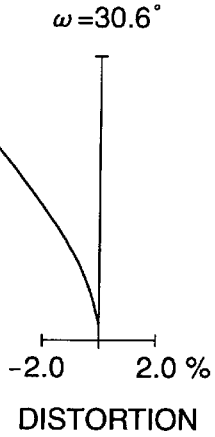
F1.24, d-line, g-line | ω=30.6°, M, S | ω=30.6°
SPHERICAL ABERRATION | ASTIGMATISM | DISTORTION
FIG. 2 (b) - 1    FIG. 2 (b) - 2    FIG. 2 (b) - 3
M
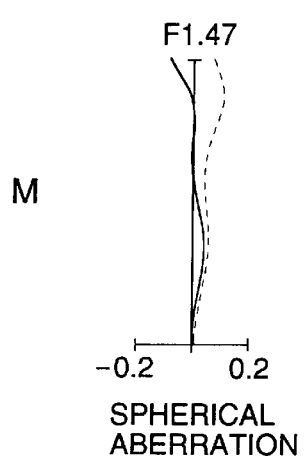 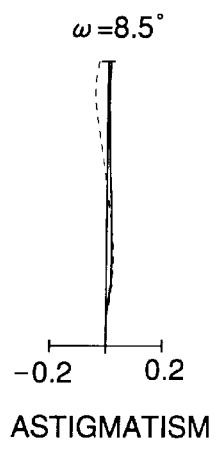 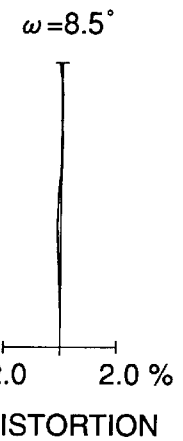
F1.47 | ω=8.5° | ω=8.5°
SPHERICAL ABERRATION | ASTIGMATISM | DISTORTION
FIG. 2 (c) - 1    FIG. 2 (c) - 2    FIG. 2 (c) - 3
T
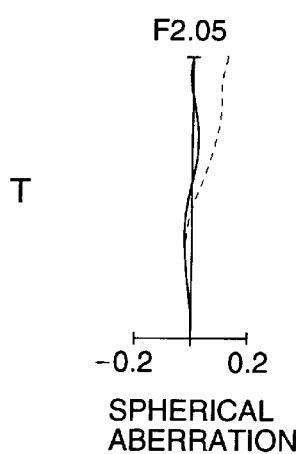 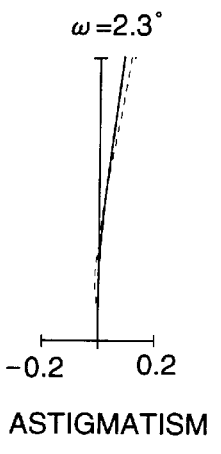 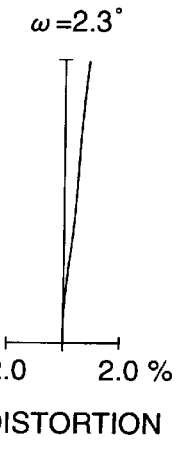
F2.05 | ω=2.3° | ω=2.3°
SPHERICAL ABERRATION | ASTIGMATISM | DISTORTION

L1　　L2　L3　L4

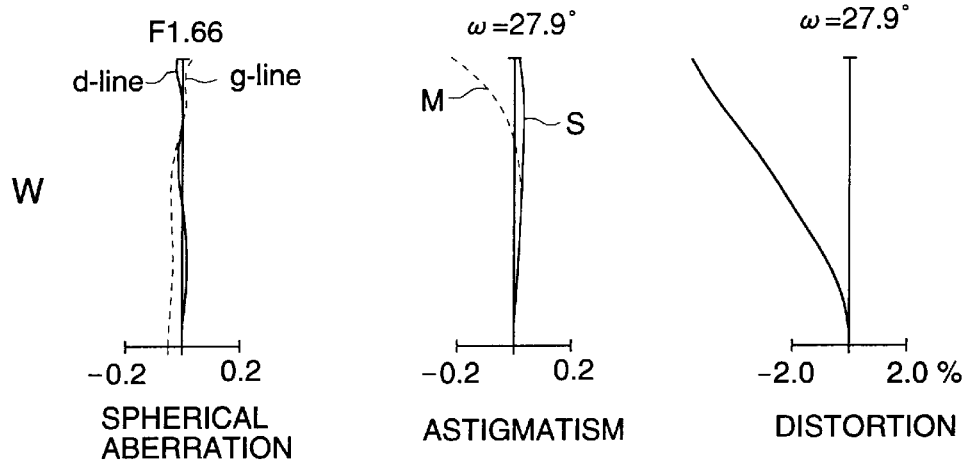
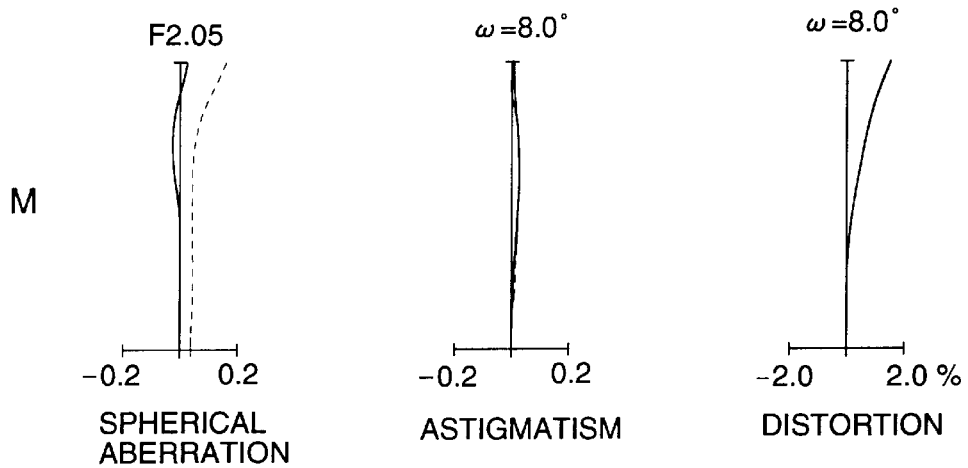
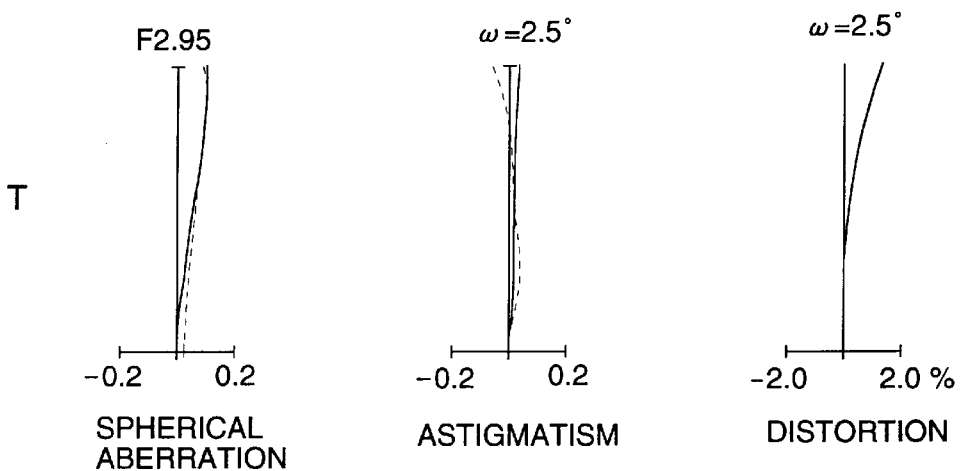

FIG. 8 (a) - 1     FIG. 8 (a) - 2     FIG. 8 (a) - 3
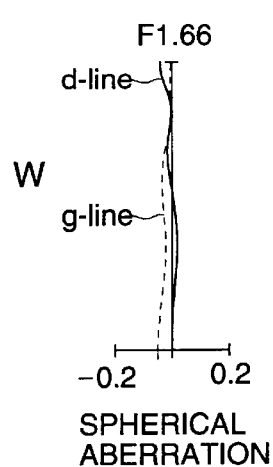
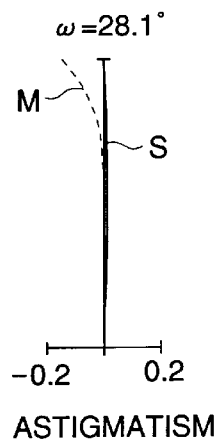
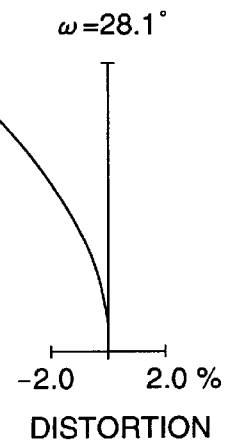
FIG. 8 (b) - 1     FIG. 8 (b) - 2     FIG. 8 (b) - 3
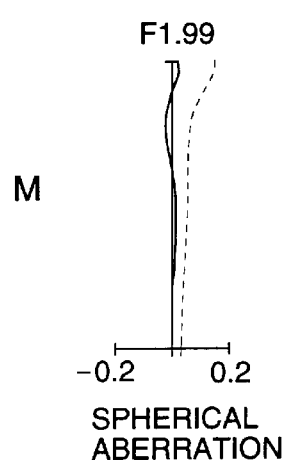
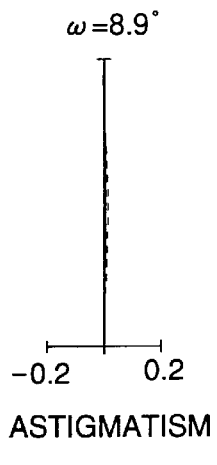
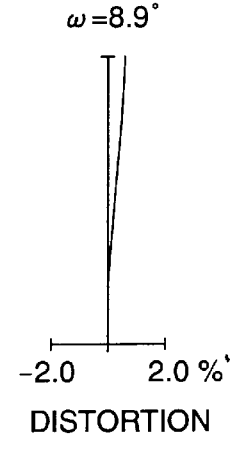
FIG. 8 (c) - 1     FIG. 8 (c) - 2     FIG. 8 (c) - 3
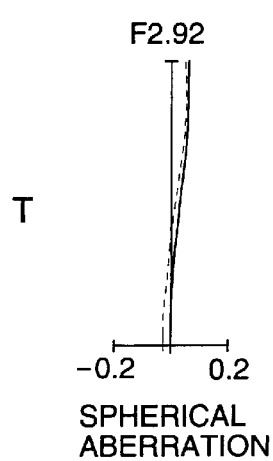
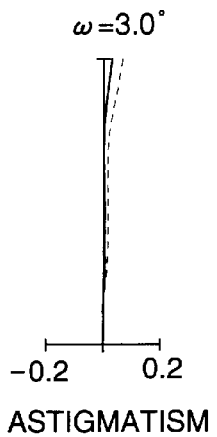
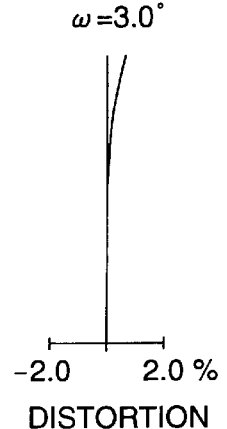

FIG. 18 (a) - 1  FIG. 18 (a) - 2  FIG. 18 (a) - 3
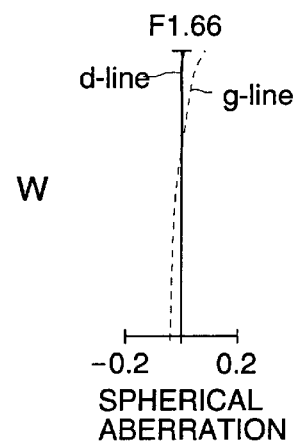 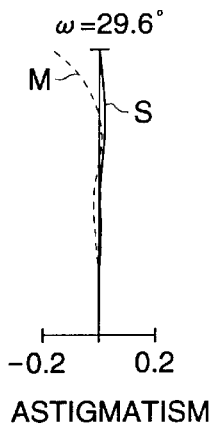 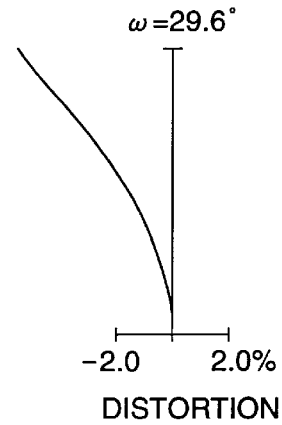
W — F1.66, d-line, g-line, SPHERICAL ABERRATION; ω=29.6°, M, S, ASTIGMATISM; ω=29.6°, DISTORTION
FIG. 18 (b) - 1  FIG. 18 (b) - 2  FIG. 18 (b) - 3
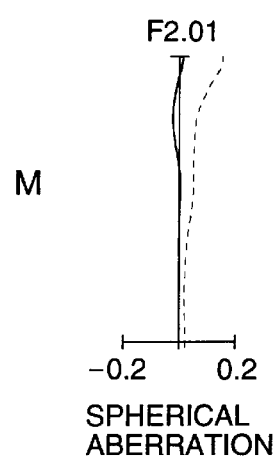  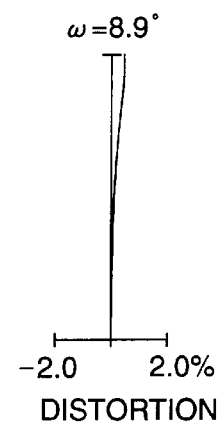
M — F2.01, SPHERICAL ABERRATION; ω=8.9°, ASTIGMATISM; ω=8.9°, DISTORTION
FIG. 18 (c) - 1  FIG. 18 (c) - 2  FIG. 18 (c) - 3
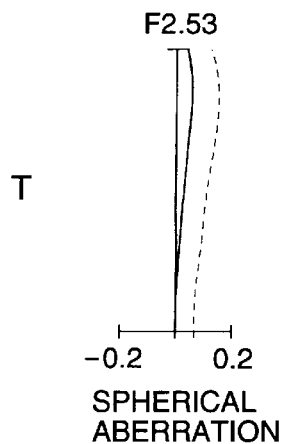 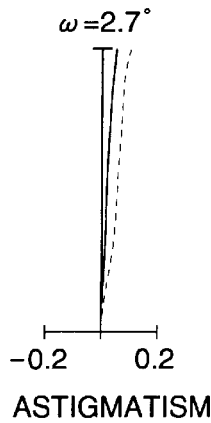 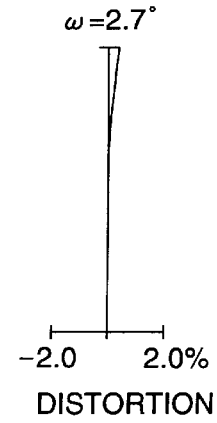
T — F2.53, SPHERICAL ABERRATION; ω=2.7°, ASTIGMATISM; ω=2.7°, DISTORTION

ZOOM LENS HAVING PLASTIC LENS IN FIRST LENS GROUP

BACKGROUND OF THE INVENTION

The present invention relates to a zoom lens which has a high aperture ratio and a high variable magnification ratio, and which is a low cost and appropriate for sill cameras or video cameras.

Conventionally, a means in which a plastic lens is used for a high variable magnification ratio zoom lens, and thereby its cost is reduced, is widely known and many patent applications are made. A zoom lens in which 3 plastic lenses are used in 12 lens elements for cost reduction and which attains a high variable magnification ratio of 10–12 times, is disclosed in Japanese Patent Publication Open to Public Inspection No. 264902/1993. In Japanese Patent Publication Open to Public Inspection No. 106046/1996, a zoom lens is disclosed, in which further cost reduction is promoted, and even when 4 plastic lenses are used in 10 lens elements, the high variable magnification ratio of 12 times is attained. However, in any example, no plastic lens is used in the first lens group, and room to promote further cost reduction is left.

Incidentally, when a plastic lens is used for the first lens, there is a problem of damage caused by an impulse from the outside. As one means to solve the problem, there is a method to equip a protective glass on the object side of the first lens. However, the protective glass contributes to increase a cost, and therefore, it prevents the object of cost reduction. As another means, there is a means to conduct special coating (hereinafter, called hard coat) on the plastic lens surface to protect the surface. However, the hard coat to protect the plastic lens surface can be coated on only material having very good moisture resistance.

There are few types of plastic which can be used as optical materials, and types of high dispersion material are specifically fewer. Therefore, there is almost no room to select the material having very good moisture resistance, and the present status is that it is very difficult to conduct the hard coat on the high dispersion plastic lens. Comparing to this, recently, types of low dispersion plastic are relatively, gradually increasing, and material having highly excellent moisture resistance such as polyolefin, or the like, is put into practical use, thereby, the hard coat can be conducted on the low dispersion plastic lens.

Examples in which plastic lens is used in the first lens group, are disclosed in Japanese Patent Publication Open to Public Inspection Nos. 53718/1982, 13211/1984, and 34882/1994.

However, in the example of Japanese Patent Publication Open to Public Inspection No. 53718/1982, the first lens is a negative plastic lens, and high dispersion material is used, therefore, it is difficult to conduct the hard coat in order to protect the lens surface. Further, an example is disclosed in Japanese Patent Publication Open to Public Inspection No. 13211/1984, in which the composition of the first lens group is sequentially in the order of a positive lens, a negative lens, and a positive lens from the object side, and the first lens is made of glass lens, and the second and third lenses are made of plastic lenses. In such the composition, circumstantial characteristics of the first lens and that of the second lens are very different, and the first lens and the second lens can not be cemented; the decentering sensitivity of the first lens and the second lens becomes high; and disused light tends to totally reflect on the second surface of the first lens, and there is a possibility that ghost is generated. Further, in Japanese Patent Publication Open to Public Inspection No. 34882/1994, a plastic lens is used for only the third lens of the first lens group, therefore, room for further cost reduction is left.

Above-mentioned conventional examples disclosed in Japanese Patent Publication Open to Public Inspection Nos. 264902/1993 and 106046/1996, have 4 lens groups in the order of positive, negative, positive and positive lenses from the object side, and the second lens group has the variable magnification function, and the fourth lens group has a correction function to correct the focal plane movement according to the variable magnification, which are well known as a zoom lens having above functions.

However, in any of conventional examples, more than half of lens components are glass lenses, and therefore, room to promote the more cost reduction is left.

SUMMARY OF THE INVENTION

The present invention is considered to solve the above problems. That is, the object of the present example is to provide a zoom lens in which many plastic lenses are used and thereby, cost is greatly reduced as compared to the conventional one, whereas the zoom lens has a high aperture ratio and a high variable magnification ratio appropriate for still cameras or video cameras.

The object of the present invention can be attained by any one of the following structures.

That is, a zoom lens having at least 3 lens groups, is characterized in that the first lens group has a positive refracting power, the second lens group has a negative refracting power; the composition of the first lens group is in the order of the first positive lens, the second negative lens, and the third positive lens; both the first and the second lenses are formed of plastic; and the first lens and the second lens are cemented to each other, and the concave surface of the cemented surface of the first lens and the second lens faces to the object side.

A zoom lens is characterized in that the third lens of the first lens group is formed of inorganic glass.

A zoom lens is characterized in that the third lens of the first lens group is formed of plastic.

A zoom lens is characterized in that the first lens group has at least one aspherical surface.

A zoom lens is characterized by satisfying the following relationships:

$$v_1 - v_2 > 15 \quad (1)$$

$$v_3 > 45 \quad (2)$$

$$0.5 < |r_2/f_1| < 1.2 \quad (3)$$

where, $v_1$ is Abbe's number of the first lens in the first lens group, $v_2$ is Abbe's number of the second lens in the first lens group, $v_3$ is Abbe's number of the third lens in the first lens group, $r_2$ is a radius of curvature of the cemented surface of the first lens and the second lens in the first lens group, and $f_1$ is a focal length of the first lens group.

Herein, the operation of the zoom lens of the present invention will be described.

When the first lens group of the zoom lens of the present invention is structured as described above, low dispersion plastic material is used for the first lens, and therefore material having excellent moisture resistance can be selected and thereby, the hard coat to protect the lens surface can be conducted. Incidentally, it is preferable that the low dispersion plastic mentioned above has an Abbe's number of more than 40, and more preferably an Abbe's number of not less than 50. To be concrete, polyolefins or acrylic resins. On the other hand, the high dispersion plastic mentioned above has an Abbe's number of not more than 40. To be concrete, polycarbonate may be listed up. Further, by cementing the first lens and the second lens to each other, the decentering sensitivity of the first lens and the second lens can be suppressed lower, and a ghost due to total reflection of the unused light on the second surface of the first lens can be prevented from being generated.

Further, in order to prevent the out-of-focus due to temperature variation, it is advantageous to use a glass lens as the third lens. Thereby, the influence of the temperature variation can be cancelled by the first lens formed of a positive plastic lens and the second lens formed of a negative plastic lens.

However, a plastic lens can be used as the third lens and thereby, further cost reduction can be attained in the following cases: where the zoom lens is not required to have so high aperture ratio, or so high variable magnification ratio; or where the out-of-focus due to temperature variation is not needed to be so strictly considered in a system in which the out-of-focus in a zooming operation is allowed, and the focus may be adjusted at the time of the completion of zooming, when the zoom lens is used for still cameras, or the like.

In order to attain the high aperture ratio and high variable magnification ratio, it is preferable to use at least one aspherical surface in the first lens group, which is effective to finely correct the distortion on the wide angle side and the spherical aberration on the telephoto side.

The above-described relationships (1)–(3) will be described below.

Relationships (1) and (2) are necessary to finely correct the chromatic aberration generated in the first lens group. When Abbe's number is out of ranges of relationships (1) and (2), correction of the longitudinal chromatic aberration specifically on the telephoto side is difficult.

Incidentally, it is more preferable that the relationship (1) has the value of the following relationship (1-1).

$$\nu_1 - \nu_2 < 22 \quad (1\text{-}1)$$

Further, it is more preferable that the relationship (2) has the value of the following relationship (2-1).

$$\nu_3 > 54 \quad (2\text{-}1)$$

The relationship (3) compensates for the relationships (1) and (2), and more finely corrects the chromatic aberration. When $|r_2/f_1|$ is smaller than the lower limit of the relationship (3), the longitudinal chromatic aberration on the telephoto side is excessively corrected, and the lateral chromatic aberration on the wide angle side is insufficiently corrected. When $|r_2/f_1|$ is larger than the upper limit of the relationship (3), the longitudinal chromatic aberration on the telephoto side is insufficiently corrected.

Incidentally, it is more preferable that the relationship (3) has the value of the following relationship (3-1).

$$0.6 < |r_2/f_1| < 1.0 \quad (3\text{-}1)$$

Further, the above object is attained by any one of the following structures.

That is, a zoom lens having the first lens group (the object side lens group) having the positive refracting power, the second lens group which has the negative refracting power and moves for variable magnification, the third lens group which has the positive refracting power and is fixed, and the fourth lens group (the image side lens group) which has the positive refracting power and corrects the change of the position of the image plane at variable magnification, the zoom lens is characterized in that one positive lens of lenses constituting the first lens group is formed of inorganic glass and all of the other lenses are formed of plastic; one negative lens of lenses constituting the second lens group is formed of inorganic glass and all of the other lenses are formed of plastic; all lenses constituting the third lens group are formed of plastic; and one positive lens of lenses constituting the fourth lens group is formed of inorganic glass and all of the other lenses are formed of plastic.

Further, a zoom lens satisfying the following conditional relationships:

$$|fw \cdot \Sigma\{1/f_{p(1)}\}| < 0.10 \quad (4)$$

$$|fw \cdot \Sigma\{1/f_{p(2)}\}| < 0.25 \quad (5)$$

$$|fw \cdot \Sigma\{1/f_{p(3,i)}\}| < 0.10 \quad (6)$$

where, fw is a focal length on the wide angle side of the entire system, $\Sigma\{1/f_{p(1)}\}$ is the sum of inverse numbers of the focal length of each plastic lens in the first lens group, $\Sigma\{1/f_{p(2)}\}$ is the sum of inverse numbers of the focal length of each plastic lens in the second lens group, $\Sigma\{1/f_{p(3,i)}\}$ is the sum of inverse numbers of the focal length of each plastic lens in the third and image side lens groups.

Further, a zoom lens characterized in that the first lens group is composed of 2 positive lens and one negative lens, and in lenses constituting the first lens group, one positive lens and one negative lens are formed of plastic, and the remaining one positive lens is formed of inorganic glass.

Further, a zoom lens characterized in that the second lens group is composed of a negative single lens whose concave surface, having larger curvature on the image side than that on the object side, faces the image side, and the cemented lens of negative and positive lenses, in order from the object side, and the negative single lens is formed of inorganic glass, and both of 2 lenses constituting the cemented lens are formed of plastic.

Still further, a zoom lens characterized in that the third lens group is composed of one positive lens formed of plastic.

Furthermore, a zoom lens characterized in that the fourth lens group has the cemented lens of positive and negative or negative and positive lenses, and a positive single lens, and both of 2 lenses constituting the cemented lens are formed of plastic, and the positive single lens is formed of inorganic glass.

Herein, the operation of the zoom lens of the present invention will be described.

Generally, in the case where plastic lenses are used in a zoom lens, when temperature compensation is strictly conducted on the entire zoom range, the temperature compensation is necessary for each lens group of the zoom lens, that is, at least one glass lens is necessary for each lens group.

In the present invention, one glass lens having positive refracting power is placed in the first lens group having the positive refracting power, the other lenses in the first lens group are formed of plastic lenses, and the refracting power of the first lens group is mainly borne on one glass lens, thereby the temperature compensation of the first lens group is conducted; and one glass lens having negative refracting power is placed in the second lens group having negative refracting power, the other lenses in the second lens group are formed of plastic lenses, and the refracting power of the second lens group is mainly borne on one glass lens, thereby the temperature compensation of the second lens group is conducted.

In both of the third and fourth lens groups, variation of the magnification ratio due to zooming is small. Accordingly, even when temperature compensation is not conducted for each lens group, temperature compensation can be sufficiently conducted on the composition system of the third and fourth lens groups. Therefore, the third lens group is composed of only plastic lens, one glass lens having positive refracting power is placed in the fourth lens group, all of the other lenses in the fourth lens group are formed of plastic lenses, and temperature compensation is conducted on these lenses and plastic lenses in the third lens group.

More concrete structure of the above-described zoom lens of the present invention will be described below.

It is preferable that the first lens group is structured by positive and negative or negative and positive plastic lenses and a positive single lens formed of inorganic glass. The chromatic aberration can be finely compensated by the positive plastic lens and the negative plastic lens, and when the positive single lens is formed of a glass lens and main refracting power of the first lens group is borne on the glass lens, temperature compensation of the first lens group can be finely conducted.

It is preferable that the second lens group is structure by a negative single lens formed of inorganic glass and the cemented lens of a negative plastic lens and a positive plastic lens. The cemented lens has a negative lens and a positive lens, and thereby, the chromatic aberration can be finely compensated, and when a negative single lens is formed of a glass lens and main refracting power of the second lens group is borne on the glass lens, the temperature compensation in the second lens group can be finely conducted. Further, when plastic lenses are cemented to each other, the decentering sensitivity can be suppressed, and the number of lens surfaces is reduced and the transmissivity can be increased.

In order to suppress the number of lenses of the glass lens group minimum, the third lens group is preferably structured by one positive plastic lens. Temperature compensation of the third and fourth lens groups may be conducted on the composition system, and therefore, one glass lens may only be placed in the third and fourth lens groups. However, in the case where the third lens group is structured by one lens, which is the minimum number of lens, when the glass lens is used for the third lens group, and all lenses of the fourth lens group are formed of plastic lenses, temperature compensation can not be conducted, and therefore, a glass lens is necessary for also the fourth lens group. When the third lens group is composed of one positive plastic lens, a glass lens is placed in the fourth lens group, and when the composition refracting power of plastic lenses in the fourth lens group is negative, temperature compensation can be conducted.

It is preferable that the fourth lens group is structured by the cemented lens of positive and negative plastic lenses or negative and positive plastic lenses and a positive single lens formed of inorganic glass. The chromatic aberration is corrected by the cemented lens, and in order to eliminate variation of refracting power at the time of temperature variation generated in the positive plastic lens of the third lens group, it is necessary that the composition refracting power of the plastic lens in the fourth lens group is negative, and a positive glass lens is necessary in the fourth lens group. Further, when plastic lenses are cemented in the same manner as in the second lens group, the decentering sensitivity can be suppressed and the number of lens surfaces is reduced and the transmissivity can be increased.

Conditional relationships (4) to (6) will be described below.

Relationship (4) relates to the refracting power of the plastic lens in the first lens group. The first lens group eliminates variation of the refracting power due to temperature variation by forming one positive lens and one negative lens in 3 lenses constituting the first lens group, of plastic lenses. Within the range of the relationship, the variation of the refracting power due to temperature variation can be fully cancelled, and an amount of variation of the focus position can be more reduced.

Incidentally, it is more preferable that the relationship (4) has a value of the following relationship (4-1).

$$|fw \cdot \Sigma\{1/f_{p(1)}\}| < 0.05 \quad (4-1)$$

The relationship (5) relates to the refracting power of the plastic lens in the second lens group. The second lens group eliminates variation of the refracting power due to temperature variation by forming one negative lens and one positive lens in 3 lenses constituting the second lens group, of plastic lenses. Within the range of the relationship, the variation of the refracting power due to temperature variation can be fully cancelled, and an amount of variation of the focus position can be more reduced.

Incidentally, it is more preferable that the relationship (5) has a value of the following relationship (5-1).

$$|fw \cdot \Sigma\{1/f_{p(2)}\}| < 0.22 \quad (5-1)$$

The relationship (6) relates to the refracting power of the plastic lens in the third and image side lens groups. In the lens system of the present invention, the third lens group is structured by only plastic lenses, and the composition refracting power of the plastic lens in the image side lens group is made negative so that the variation of the refracting power due to temperature variation can be cancelled. Within the range of the relationship (6), an amount of variation of the focus position can be more reduced.

Incidentally, it is more preferable that the relationship (6) has a value of the following relationship (6-1).

$$|fw \cdot \Sigma\{1/f_{p(3,i)}\}| < 0.05 \quad (6-1)$$

BRIEF DESCRIPTION OF THE DRAWINGS

FIGS. 2(a)-1 to 2(c)-3 are views showing aberration of lenses in Example 1.

FIG. 3 is a sectional view of lenses in Example 2.

FIGS. 4(a)-1 to 4(c)-3 are views showing aberration of lenses in Example 2.

FIGS. 6(a)-1 to 6(c)-3 are views showing aberration of lenses in Example 3.

FIGS. 8(a)-1 to 8(c)-3 are views showing aberration of lenses in Example 4.

FIGS. 10(a)-1 to 10(c)-3 are views showing aberration of lenses in Example 5.

FIGS. 18(*a*)-1 to 18(*c*)-3 are views showing aberration of lenses in Example 9.

DETAILED DESCRIPTION OF THE PREFERRED EMBODIMENT

Examples 1 to 10, which satisfy the above-described conditions, will be shown below.

Herein, r is the radius of curvature of each lens surface, d is the lens thickness or lens interval, $n_d$ is a refractive index, and $v_d$ is Abbe's number. Further, * shown in Examples 1–4 means a plastic lens.

When x axis is set in the direction of the optical axis and y axis is set in the direction perpendicular to the optical axis, and $\kappa$, A2, A4, A6, A8, A10, A12 are aspherical coefficients, the shape of the aspherical surface is expressed by the following equation.

$$x = \frac{y^2/r}{1 + \sqrt{1 - (1+\kappa)y^2/r^2}} + A_2 y^2 + A_4 y^4 + A_6 y^6 + A_8 y^8 + A_{10} y^{10} + A_{12} y^{12} \quad \text{[Equation 1]}$$

Initially, Examples 1–4 will be shown below.

Figure 1:
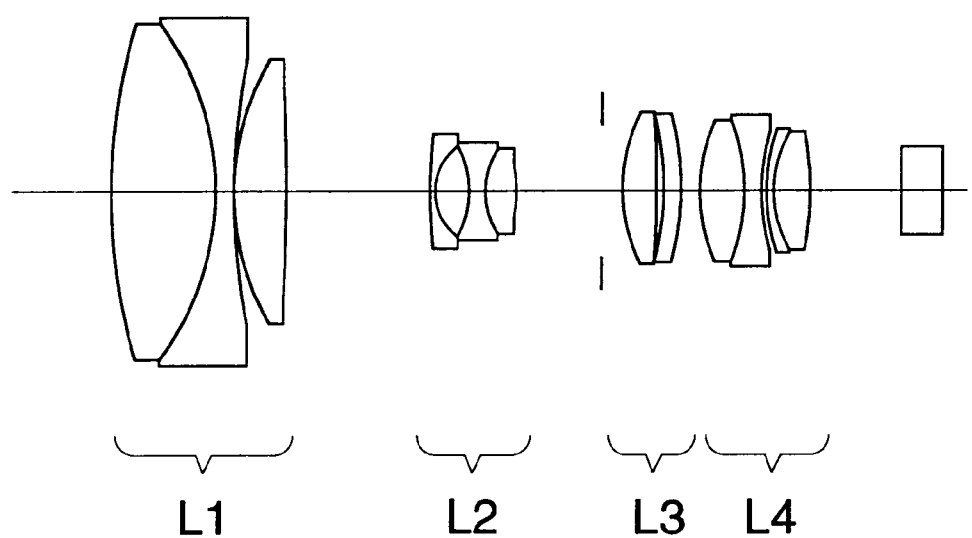
FIG. 1 is a sectional view of lenses of Example 1.
Figure 3:
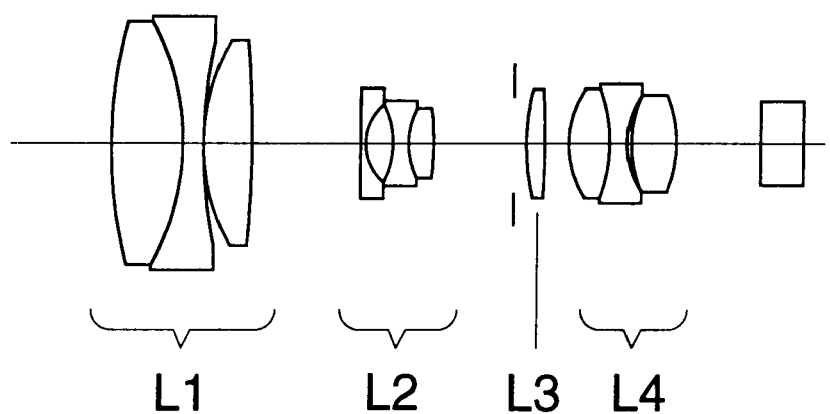
Figure 4:
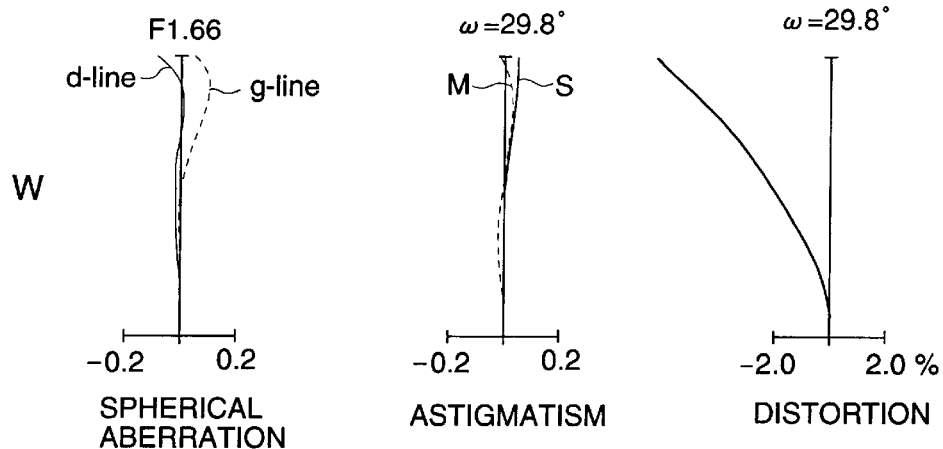
Figure 4:
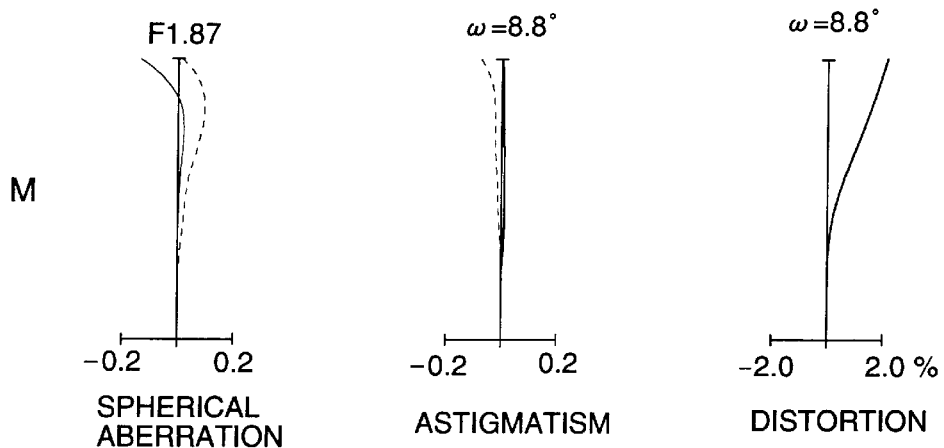
Figure 4:
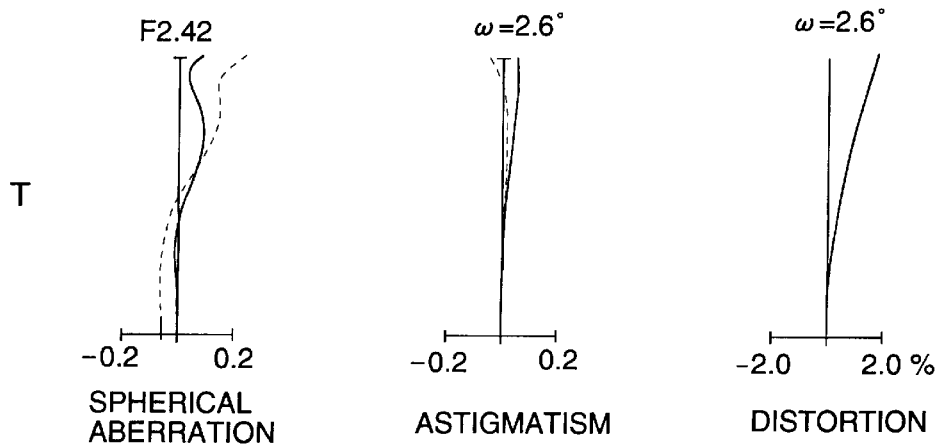
Figure 5:
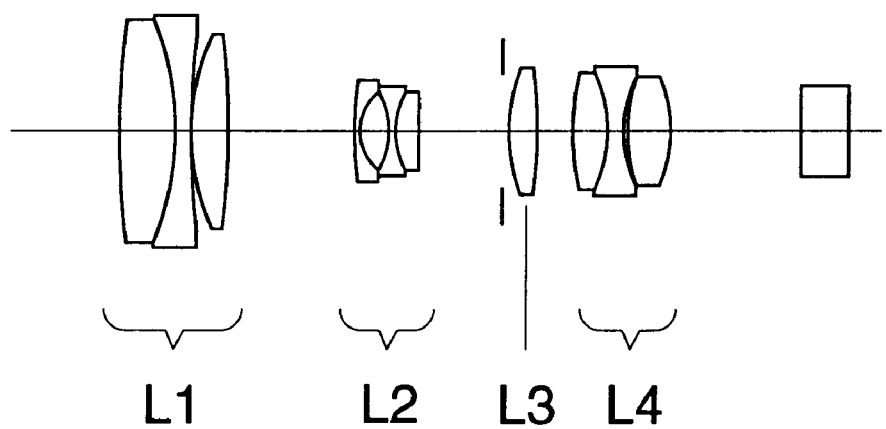
FIG. 5 is a sectional view of lenses in Example 3.
Figure 7:
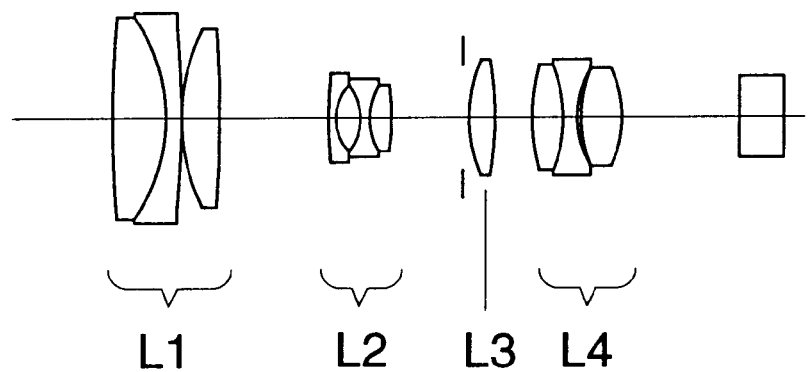
FIG. 7 is a sectional view of lenses in Example 4.

FIG. 1 is a sectional view of lenses in Example 1. FIGS. 2(*a*)-1 to 2(*c*)-3 are aberration curves of lenses in Example 1, and FIGS. 2(*a*)-1 to 2(*a*)-3 are aberration curves at the wide angle end, FIGS. 2(*b*)-1 to 2(*b*)-3 are those in the intermediate area, and 2(*c*)-1 to 2(*c*)-3 are those at the telephoto end. FIG. 3 is a sectional view of lenses in Example 2. FIGS. 4(*a*)-1 to 4(*c*)-3 are aberration curves of lenses in Example 2, and FIGS. 4(*a*)-1 to 4(*a*)-3 are aberration curves at the wide angle end, FIGS. 4(*b*)-1 to 4(*b*)-3 are those in the intermediate area, and 4(*c*)-1 to 4(*c*)-3 are those at the telephoto end. FIG. 5 is a sectional view of lenses in Example 3. FIGS. 6(*a*)-1 to 6(*c*)-3 are aberration curves of lenses in Example 3, and FIGS. 6(*a*)-1 to 6(*a*)-3 are aberration curves at the wide angle end, FIGS. 6(*b*)-1 to 6(*b*)-3 are those in the intermediate area, and 6(*c*)-1 to 6(*c*)-3 are those at the telephoto end. FIG. 7 is a sectional view of lenses in Example 4. FIGS. 8(*a*)-1 to 8(*c*)-3 are aberration curves of lenses in Example 4, and FIGS. 8(*a*)-1 to 8(*a*)-3 are aberration curves at the wide angle end, FIGS. 8(*b*)-1 to 8(*b*)-3 are those in the intermediate area, and 8(*c*)-1 to 8(*c*)-3 are those at the telephoto end. Symbols L1, L2, L3, and L4 shown in FIGS. 1, 3, 5, 7 respectively show the first, second, third, and fourth lens groups.

EXAMPLE 1

Focal length: f=4.16–56.49

F-number: F1.24–2.05

Angle of view: 2ω=61.2°–4.6°

TABLE 1

| Surface No. | r | d | $n_d$ | $v_d$ |
|---|---|---|---|---|
| 1 | 56.516 | 10.60 | 1.54100* | 53.0 |
| 2 | −28.352 | 2.00 | 1.58300* | 30.0 |
| 3 | 89.820 | 0.20 | | |
| 4 | 27.897 | 4.90 | 1.69680 | 55.5 |
| 5 | −326.707 | A | | |
| 6 | 67.765 | 0.55 | 1.81600 | 46.6 |
| 7 | 5.583 | 3.50 | | |
| 8 | −9.349 | 1.65 | 1.49700* | 56.0 |
| 9 | 7.664 | 3.10 | 1.58300* | 30.0 |
| 10 | −31.321 | B | | |
| 11 | 17.459 | 3.50 | 1.51823 | 59.0 |
| 12 | −96.837 | 0.80 | | |
| 13 | 30.000 | 1.50 | 1.58300* | 30.0 |
| 14 | −32.443 | C | | |
| 15 | 16.522 | 4.60 | 1.49700* | 56.0 |
| 16 | −19.990 | 1.80 | 1.58300* | 30.0 |
| 17 | 30.139 | 0.50 | | |
| 18 | 18.857 | 0.60 | 1.84666 | 23.8 |
| 19 | 10.550 | 3.85 | 1.69680 | 55.5 |
| 20 | −29.102 | D | | |
| 21 | ∞ | 4.48 | 1.51633 | 64.1 |
| 22 | ∞ | | | |

TABLE 2

| | Aspherical coefficient | | | Aspherical coefficient | |
|---|---|---|---|---|---|
| 1st surface | $\kappa =$ | 2.46870 × 10⁰ | 14th surface | $\kappa =$ | −8.90200 × 10⁻² |
| | $A_2 =$ | 0 | | $A_2 =$ | 0 |
| | $A_4 =$ | −6.18830 × 10⁻⁶ | | $A_4 =$ | 8.15400 × 10⁻⁶ |
| | $A_6 =$ | 3.47790 × 10⁻⁸ | | $A_6 =$ | 1.51040 × 10⁻⁶ |
| | $A_8 =$ | −1.71320 × 10⁻¹⁰ | | $A_8 =$ | −2.41610 × 10⁻⁸ |
| | $A_{10} =$ | 4.26970 × 10⁻¹³ | | $A_{10} =$ | 1.27010 × 10⁻¹⁰ |
| | $A_{12} =$ | −3.88800 × 10⁻¹⁶ | | | |
| 3rd surface | $\kappa =$ | 7.8590 × 10⁰ | 15th surface | $\kappa =$ | −1.31200 × 10⁰ |
| | $A_2 =$ | 0 | | $A_2 =$ | 0 |
| | $A_4 =$ | −3.10500 × 10⁻⁶ | | $A_4 =$ | 3.87700 × 10⁻⁶ |
| | $A_6 =$ | 7.12200 × 10⁻⁸ | | $A_6 =$ | 2.51090 × 10⁻⁶ |
| | $A_8 =$ | −4.36400 × 10⁻¹⁰ | | $A_8 =$ | −1.07160 × 10⁻⁸ |
| | $A_{10} =$ | 1.45020 × 10⁻¹² | | $A_{10} =$ | −5.86230 × 10⁻¹⁰ |
| | $A_{12} =$ | −1.74920 × 10⁻¹⁵ | | $A_{12} =$ | 7.30500 × 10⁻¹² |
| 8th surface | $\kappa =$ | −1.16130 × 10⁰ | 17th surface | $\kappa =$ | 1.55960 × 10⁰ |
| | $A_2 =$ | 0 | | $A_2 =$ | 0 |
| | $A_4 =$ | 2.39670 × 10⁻⁴ | | $A_4 =$ | 1.24110 × 10⁻⁴ |
| | $A_6 =$ | −1.37990 × 10⁻⁵ | | $A_6 =$ | −3.72950 × 10⁻⁶ |

TABLE 2-continued

| | Aspherical coefficient | | | Aspherical coefficient |
|---|---|---|---|---|
| | $A_8 =$ | $-1.94700 \times 10^{-8}$ | $A_8 =$ | $3.47200 \times 10^{-7}$ |
| | $A_{10} =$ | $7.39500 \times 10^{-8}$ | $A_{10} =$ | $-1.01240 \times 10^{-8}$ |
| | $A_{12} =$ | $-3.47220 \times 10^{-9}$ | $A_{12} =$ | $1.03180 \times 10^{-10}$ |
| 10th surface | $\kappa =$ | $-8.38910 \times 10^{-2}$ | | |
| | $A_2 =$ | 0 | | |
| | $A_4 =$ | $8.15370 \times 10^{-5}$ | | |
| | $A_6 =$ | $-5.98240 \times 10^{-6}$ | | |
| | $A_8 =$ | $2.40320 \times 10^{-7}$ | | |
| | $A_{10} =$ | $-6.96690 \times 10^{-9}$ | | |

TABLE 3

| | Variable interval | | | |
|---|---|---|---|---|
| Focal length | A | B | C | D |
| 4.16 | 0.50 | 25.60 | 5.08 | 6.33 |
| 15.33 | 14.94 | 11.16 | 2.06 | 9.35 |
| 56.49 | 22.78 | 3.32 | 5.02 | 6.39 |

$|r_2/f_1| = 0.77$

EXAMPLE 2

Focal length: f=4.28–49.36

F-number: F1.66–2.42

Angle of view: 2ω=59.6°–5.2°

TABLE 4

| Surface No. | r | d | $n_d$ | $\nu_d$ |
|---|---|---|---|---|
| 1 | 48.744 | 7.10 | 1.49700* | 56.0 |
| 2 | -24.682 | 2.00 | 1.58300* | 30.0 |
| 3 | 67.371 | 0.20 | | |
| 4 | 20.579 | 4.50 | 1.69680 | 55.5 |
| 5 | -107.073 | A | | |
| 6 | ∞ | 0.55 | 1.72916 | 54.7 |
| 7 | 4.571 | 2.75 | | |
| 8 | -8.232 | 1.54 | 1.49700* | 56.0 |
| 9 | 7.771 | 2.47 | 1.58300* | 30.0 |
| 10 | -22.535 | B | | |
| 11 | 21.663 | 1.73 | 1.48749 | 70.2 |
| 12 | -61.979 | C | | |
| 13 | 9.268 | 4.00 | 1.49700* | 56.0 |
| 14 | -16.346 | 1.90 | 1.58300* | 30.0 |
| 15 | 9.435 | 0.46 | | |
| 16 | 11.563 | 4.20 | 1.48749 | 70.2 |
| 17 | -11.563 | D | | |
| 18 | ∞ | 4.30 | 1.51633 | 64.1 |
| 19 | ∞ | | | |

TABLE 5

| | Aspherical coefficient | | | Aspherical coefficient | |
|---|---|---|---|---|---|
| 1st surface | $\kappa =$ | $5.76650 \times 10^0$ | 10th surface | $\kappa =$ | $-2.44220 \times 10^{-2}$ |
| | $A_2 =$ | 0 | | $A_2 =$ | 0 |
| | $A_4 =$ | $-1.06110 \times 10^{-5}$ | | $A_4 =$ | $1.66120 \times 10^{-4}$ |
| | $A_6 =$ | $-2.11190 \times 10^{-7}$ | | $A_6 =$ | $-1.59600 \times 10^{-5}$ |
| | $A_8 =$ | $-1.54700 \times 10^{-9}$ | | $A_8 =$ | $-9.44430 \times 10^{-7}$ |
| | $A_{10} =$ | $4.65120 \times 10^{-12}$ | | $A_{10} =$ | $7.07510 \times 10^{-8}$ |
| | $A_{12} =$ | $-1.96110 \times 10^{-15}$ | | | |
| 3rd surface | $\kappa =$ | $2.60970 \times 10^1$ | 13th surface | $\kappa =$ | $2.64940 \times 10^{-2}$ |
| | $A_2 =$ | 0 | | $A_2 =$ | 0 |
| | $A_4 =$ | $-1.57910 \times 10^{-6}$ | | $A_4 =$ | $2.85290 \times 10^{-5}$ |
| | $A_6 =$ | $2.94500 \times 10^{-7}$ | | $A_6 =$ | $-3.19010 \times 10^{-6}$ |
| | $A_8 =$ | $-2.66800 \times 10^{-9}$ | | $A_8 =$ | $-7.91230 \times 10^{-8}$ |
| | $A_{10} =$ | $9.00400 \times 10^{-12}$ | | $A_{10} =$ | $2.17680 \times 10^{-9}$ |
| | $A_{12} =$ | $-7.49340 \times 10^{-15}$ | | | |
| 8th surface | $\kappa =$ | $-1.04240 \times 10^0$ | 15th surface | $\kappa =$ | $2.03100 \times 10^0$ |
| | $A_2 =$ | 0 | | $A_2 =$ | 0 |
| | $A_4 =$ | $7.13290 \times 10^{-4}$ | | $A_4 =$ | $1.63430 \times 10^{-4}$ |
| | $A_6 =$ | $-5.52080 \times 10^{-5}$ | | $A_6 =$ | $-1.40390 \times 10^{-5}$ |
| | $A_8 =$ | $2.16380 \times 10^{-6}$ | | $A_8 =$ | $9.91920 \times 10^{-10}$ |
| | | | | $A_{10} =$ | $-1.28950 \times 10^{-8}$ |

TABLE 6

| | Variable interval | | | |
|---|---|---|---|---|
| Focal length | A | B | C | D |
| 4.28 | 0.50 | 19.64 | 4.80 | 6.21 |
| 14.54 | 10.75 | 9.39 | 2.47 | 8.54 |
| 49.36 | 16.82 | 3.32 | 6.77 | 4.24 |

$|r_2/f_1| = 0.90$

EXAMPLE 3

Focal length: f=4.59–52.9

F-number: F1.66–2.95

Angle of view: 2ω=55.8°–5.0°

TABLE 7

| Surface No. | r | d | $n_d$ | $v_d$ |
|---|---|---|---|---|
| 1 | 63.127 | 5.20 | 1.52470* | 56.0 |
| 2 | −29.046 | 1.42 | 1.58300* | 30.0 |
| 3 | 79.642 | 0.19 | | |
| 4 | 21.656 | 3.31 | 1.58913 | 61.2 |
| 5 | −65.096 | A | | |
| 6 | 29.255 | 0.55 | 1.77250 | 49.6 |
| 7 | 4.712 | 2.70 | | |
| 8 | −7.285 | 0.55 | 1.58144 | 40.7 |
| 9 | 7.285 | 2.30 | 1.84666 | 23.8 |
| 10 | −130.838 | B | | |
| 11 | 15.517 | 2.55 | 1.49700* | 56.0 |
| 12 | −36.276 | C | | |
| 13 | 17.295 | 3.20 | 1.49700* | 56.0 |
| 14 | −14.000 | 1.50 | 1.58300* | 30.0 |
| 15 | 9.694 | 0.35 | | |
| 16 | 12.558 | 4.10 | 1.58913 | 61.2 |
| 17 | −12.558 | D | | |
| 18 | ∞ | 4.48 | 1.51633 | 64.1 |
| 19 | ∞ | | | |

TABLE 8

| Aspherical coefficient | | Aspherical coefficient | |
|---|---|---|---|
| 1st surface | $\kappa = 9.96090 \times 10^0$<br>$A_2 = 0$<br>$A_4 = -1.30064 \times 10^{-5}$<br>$A_6 = 5.00198 \times 10^{-8}$<br>$A_8 = 7.70810 \times 10^{-11}$<br>$A_{10} = -1.82634 \times 10^{-12}$<br>$A_{12} = 7.25944 \times 10^{-16}$ | 12th surface | $\kappa = -3.62780 \times 10^{-1}$<br>$A_2 = 6.43790 \times 10^{-6}$<br>$A_4 = -4.20640 \times 10^{-4}$<br>$A_6 = 4.86500 \times 10^{-5}$<br>$A_8 = -2.46740 \times 10^{-6}$<br>$A_{10} = 6.16579 \times 10^{-8}$<br>$A_{12} = -6.14960 \times 10^{-10}$ |
| 3rd surface | $\kappa = 3.17790 \times 10^1$<br>$A_2 = 0$<br>$A_4 = -1.31921 \times 10^{-6}$<br>$A_6 = 6.63602 \times 10^{-8}$<br>$A_8 = 1.21266 \times 10^{-10}$<br>$A_{10} = -2.95560 \times 10^{-12}$<br>$A_{12} = 1.70625 \times 10^{-15}$ | 13th surface | $\kappa = 1.92580 \times 10^0$<br>$A_2 = 0$<br>$A_4 = -3.69060 \times 10^{-4}$<br>$A_6 = 3.39130 \times 10^{-5}$<br>$A_8 = -2.07930 \times 10^{-6}$<br>$A_{10} = 5.43390 \times 10^{-8}$<br>$A_{12} = -5.64120 \times 10^{-10}$ |
| 11th surface | $\kappa = 9.77120 \times 10^{-1}$<br>$A_2 = 0$<br>$A_4 = -4.73960 \times 10^{-4}$<br>$A_6 = 4.25190 \times 10^{-5}$<br>$A_8 = -2.26610 \times 10^{-6}$<br>$A_8 = 5.90820 \times 10^{-8}$<br>$A_{12} = -6.09030 \times 10^{-10}$ | 15th surface | $\kappa = -1.39580 \times 10^0$<br>$A_2 = 0$<br>$A_4 = 9.19140 \times 10^{-5}$<br>$A_6 = 2.84430 \times 10^{-5}$<br>$A_8 = -2.14730 \times 10^{-6}$<br>$A_{10} = 6.66750 \times 10^{-8}$<br>$A_{12} = -8.02360 \times 10^{-10}$ |

TABLE 9

Variable interval

| Focal length | A | B | C | D |
|---|---|---|---|---|
| 4.59 | 0.55 | 19.72 | 7.89 | 7.63 |
| 16.09 | 11.86 | 8.41 | 3.28 | 12.24 |
| 52.92 | 18.55 | 1.72 | 5.68 | 9.84 |

$|r_2/f_1| = 0.98$

EXAMPLE 4

Focal length: f=4.59–44.10

F-number: F1.66–2.92

Angle of view: 2ω=56.2°–6.0°

TABLE 10

| Surface No. | r | d | $n_d$ | $v_d$ |
|---|---|---|---|---|
| 1 | 111.985 | 5.50 | 1.52470* | 56.0 |
| 2 | −18.152 | 1.50 | 1.58300* | 30.0 |
| 3 | −130.078 | 0.20 | | |
| 4 | 21.285 | 3.70 | 1.52470* | 56.0 |
| 5 | −138.844 | A | | |
| 6 | 59.909 | 0.55 | 1.77250 | 49.6 |
| 7 | 4.992 | 2.60 | | |
| 8 | −6.829 | 1.00 | 1.49700* | 56.0 |
| 9 | 6.442 | 2.20 | 1.58300* | 30.0 |
| 10 | −27.611 | B | | |
| 11 | 15.495 | 2.55 | 1.49700* | 56.0 |
| 12 | −36.512 | C | | |
| 13 | 17.312 | 3.20 | 1.49700* | 56.0 |
| 14 | −13.390 | 1.50 | 1.58300* | 30.0 |
| 15 | 9.756 | 0.35 | | |
| 16 | 12.575 | 4.10 | 1.58913 | 61.2 |
| 17 | −12.575 | D | | |
| 18 | ∞ | 4.48 | 1.51633 | 64.1 |
| 19 | ∞ | | | |

TABLE 11

| Aspherical coefficient | | Aspherical coefficient | |
|---|---|---|---|
| 1st surface | $\kappa = 7.36690 \times 10^0$<br>$A_2 = 0$<br>$A_4 = -1.25644 \times 10^{-6}$<br>$A_6 = -5.93197 \times 10^{-9}$<br>$A_8 = 1.37858 \times 10^{-10}$<br>$A_{10} = 6.36718 \times 10^{-13}$<br>$A_{12} = -1.88541 \times 10^{-15}$ | 11th surface | $\kappa = 4.01940 \times 10^{-1}$<br>$A_2 = 0$<br>$A_4 = -5.62660 \times 10^{-4}$<br>$A_6 = 5.16250 \times 10^{-5}$<br>$A_8 = -2.57580 \times 10^{-6}$<br>$A_{10} = 6.44420 \times 10^{-8}$<br>$A_{12} = -6.44530 \times 10^{-10}$ |
| 3rd surface | $\kappa = 3.13193 \times 10^1$<br>$A_2 = 0$<br>$A_4 = 7.69046 \times 10^{-6}$<br>$A_6 = -1.45473 \times 10^{-8}$<br>$A_8 = 1.575.36 \times 10^{-10}$<br>$A_{10} = 2.29179 \times 10^{-12}$<br>$A_{12} = -1.14979 \times 10^{-14}$ | 12th surface | $\kappa = -2.70210 \times 10^{-1}$<br>$A_2 = 6.43790 \times 10^{-6}$<br>$A_4 = -5.19030 \times 10^{-4}$<br>$A_6 = 5.40960 \times 10^{-5}$<br>$A_8 = -2.58200 \times 10^{-6}$<br>$A_{10} = 6.24290 \times 10^{-8}$<br>$A_{12} = -6.10980 \times 10^{-10}$ |
| 8th surface | $\kappa = -1.04120 \times 10^0$<br>$A_2 = 0$<br>$A_4 = 1.45290 \times 10^{-4}$<br>$A_6 = -1.10710 \times 10^{-5}$<br>$A_8 = -3.97450 \times 10^{-6}$<br>$A_{10} = 3.93160 \times 10^{-7}$<br>$A_{12} = -1.07720 \times 10^{-8}$ | 13th surface | $\kappa = 7.37050 \times 10^{-1}$<br>$A_2 = 0$<br>$A_4 = -3.39590 \times 10^{-4}$<br>$A_6 = 2.68820 \times 10^{-5}$<br>$A_8 = -1.63710 \times 10^{-6}$<br>$A_{10} = 4.24050 \times 10^{-8}$<br>$A_{12} = -4.34370 \times 10^{-10}$ |
| 10th surface | $\kappa = 2.34960 \times 10^{-1}$<br>$A_2 = 0$<br>$A_4 = 7.62730 \times 10^{-5}$<br>$A_6 = -4.46300 \times 10^{-6}$<br>$A_8 = -3.18290 \times 10^{-7}$<br>$A_{10} = 1.74360 \times 10^{-8}$ | 15th surface | $\kappa = -4.55930 \times 10^0$<br>$A_0 = 0$<br>$A_4 = 5.18640 \times 10{-4}$<br>$A_6 = 1.47350 \times 10^{-5}$<br>$A_8 = -1.74760 \times 10^{-6}$<br>$A_{10} = 6.16470 \times 10^{-8}$<br>$A_{12} = -8.02360 \times 10^{-10}$ |

TABLE 12

Variable interval

| Focal length | A | B | C | D |
|---|---|---|---|---|
| 4.59 | 0.55 | 18.92 | 8.32 | 7.65 |
| 14.67 | 11.36 | 8.11 | 3.83 | 12.14 |
| 44.10 | 17.75 | 1.72 | 3.62 | 13.35 |

$|r_2/f_1| = 0.61$

The results of above Examples show that in all Examples 1 to 4, there can be obtained a zoom lens having small aberration and excellent optical performance with the zoom lens in which the first lens in the first lens group is made plastic lens and many plastic lenses are used. Incidentally, the distortion at wide angle end to the extent shown in the present Examples does not offer big problem.

Next, Examples 5–10 will be described.

Numerals *1–*4 shown in Examples 5–10 express plastic lenses, and changes of their refractive indexes due to respective temperature variation are as follows.

TABLE 13

|    | Refractive index at normal temperature | Refractive index at normal temperature +30° C. |
|----|---|---|
| *1 | 1.5247 | 1.5211 |
| *2 | 1.583  | 1.5788 |
| *3 | 1.497  | 1.4934 |
| *4 | 1.5122 | 1.5092 |

Figure 9:
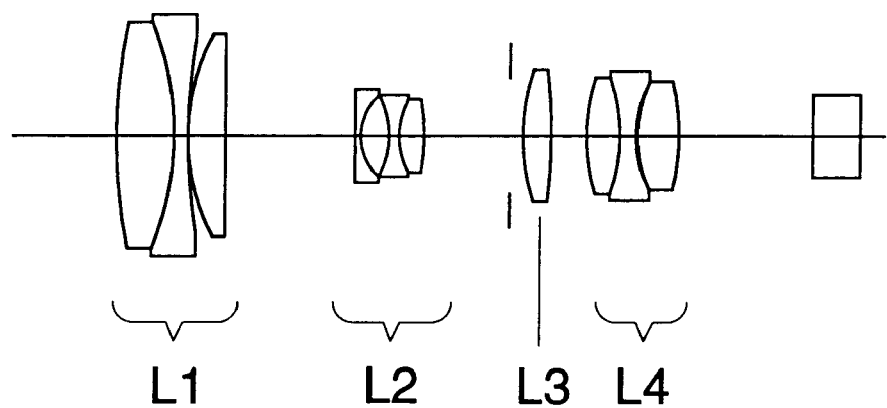
FIG. 9 is a sectional view of lenses in Example 5.
Figure 10:
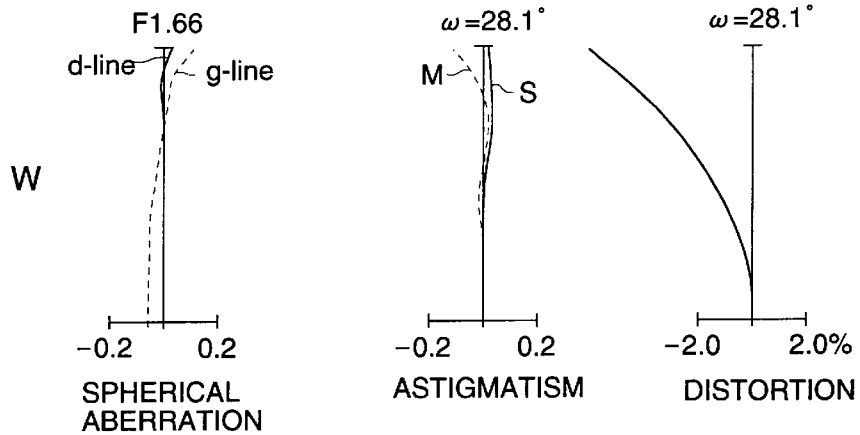
Figure 10:
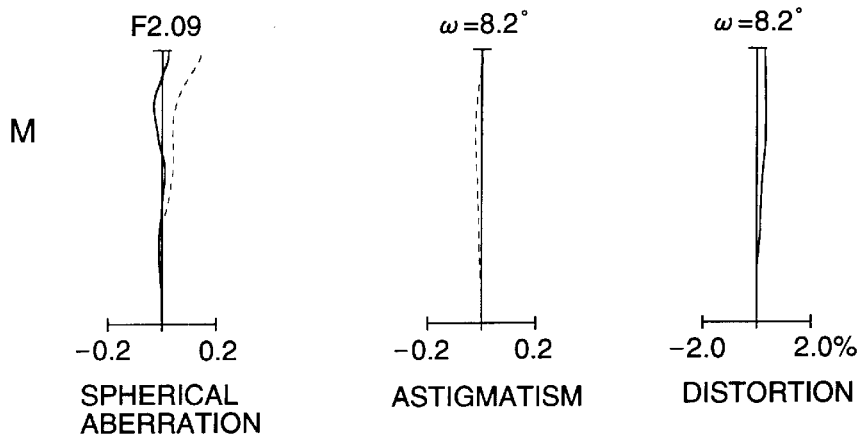
Figure 10:
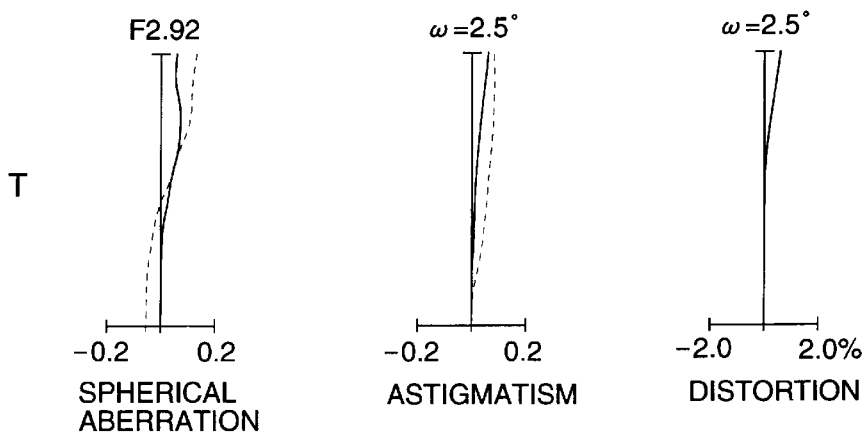
Figure 11:
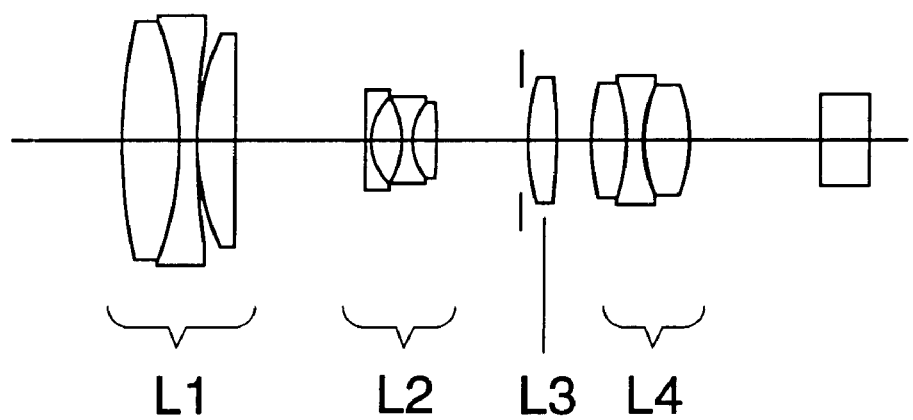
FIG. 11 is a sectional view of lenses in Example 6.
Figure 12:
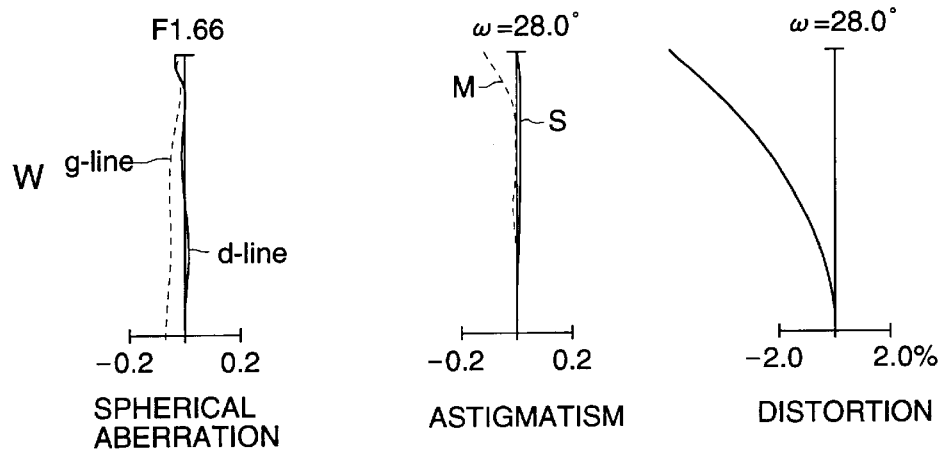
FIGS. 12(*a*)-1 to 12(*c*)-3 are views showing aberration of lenses in Example 6.
Figure 12:
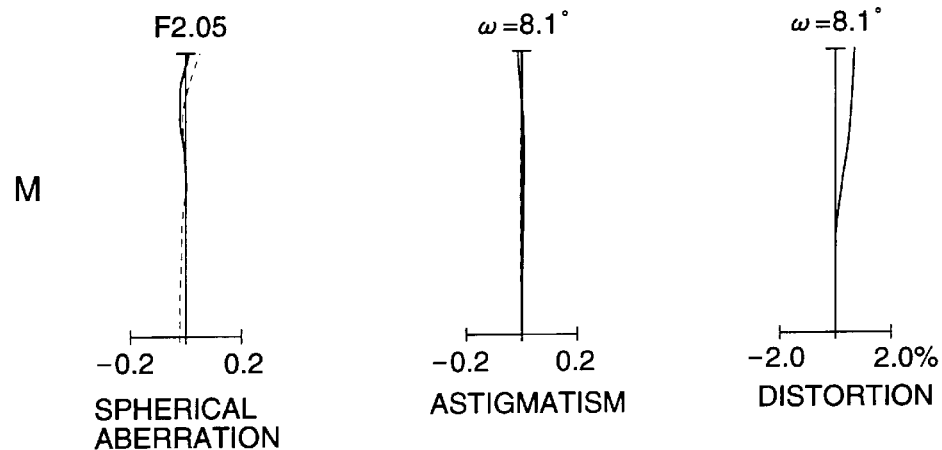
Figure 12:
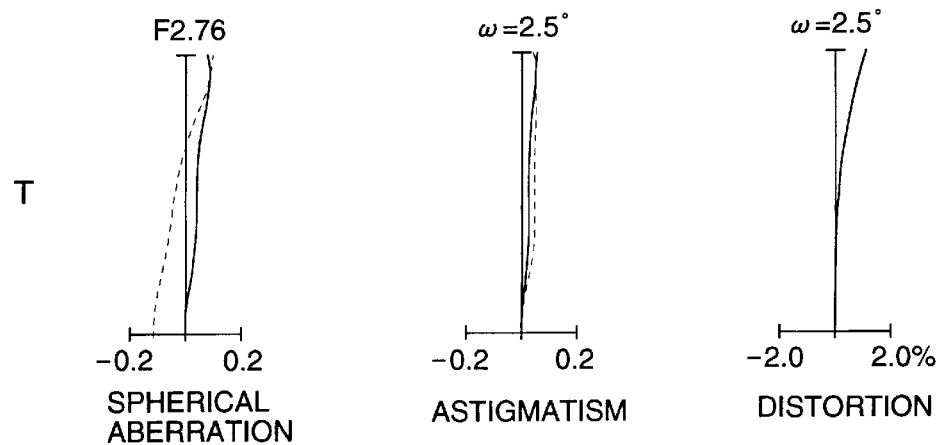
Figure 13:
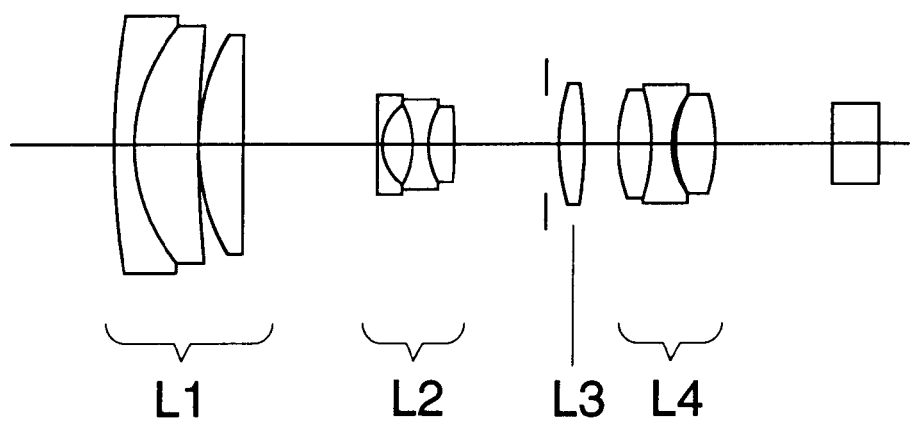
FIG. 13 is a sectional view of lenses in Example 7.
Figure 14:
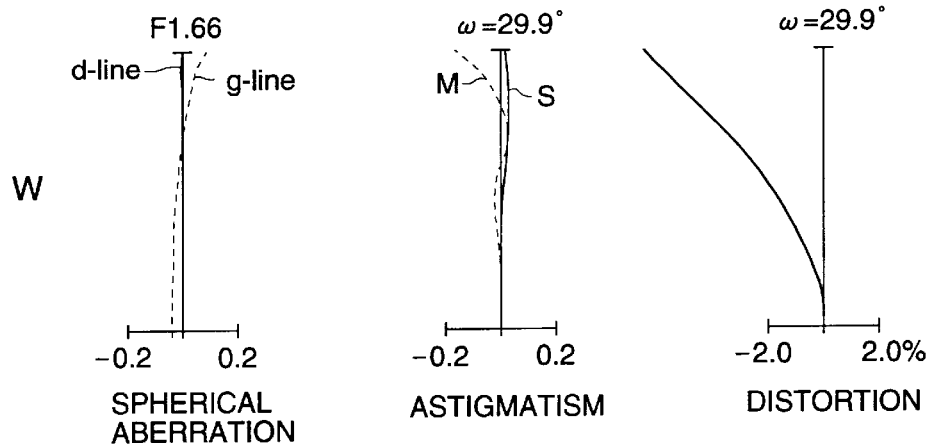
FIGS. 14(*a*)-1 to 14(*c*)-3 are views showing aberration of lenses in Example 7.
Figure 14:
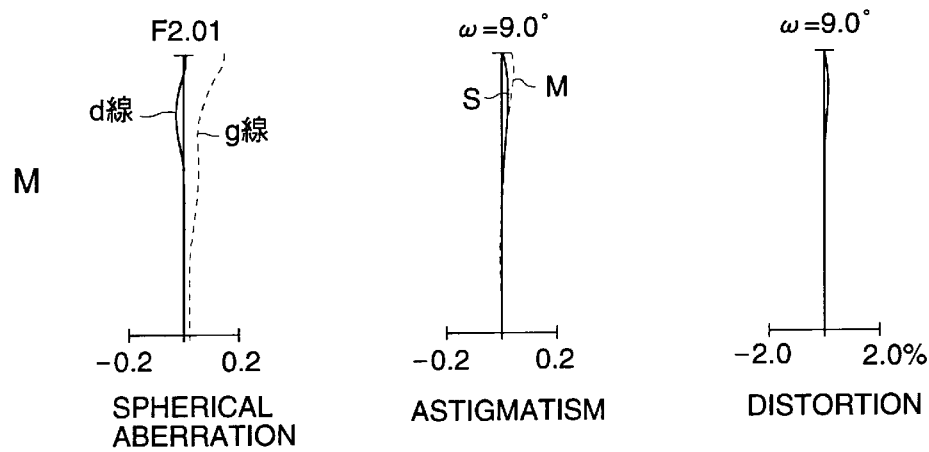
Figure 14:
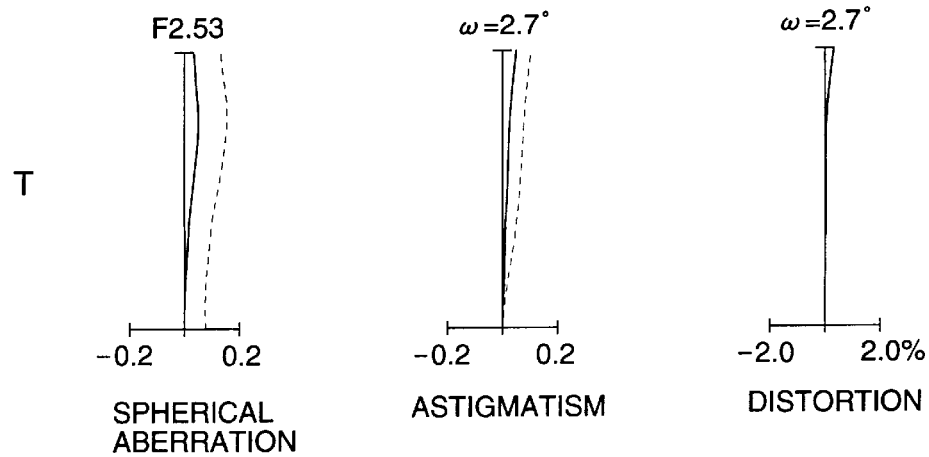
Figure 15:
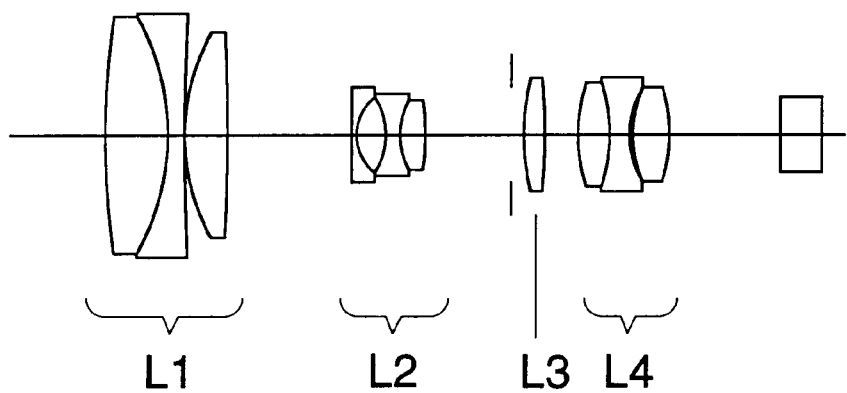
FIG. 15 is a sectional view of lenses in Example 8.
Figure 16:
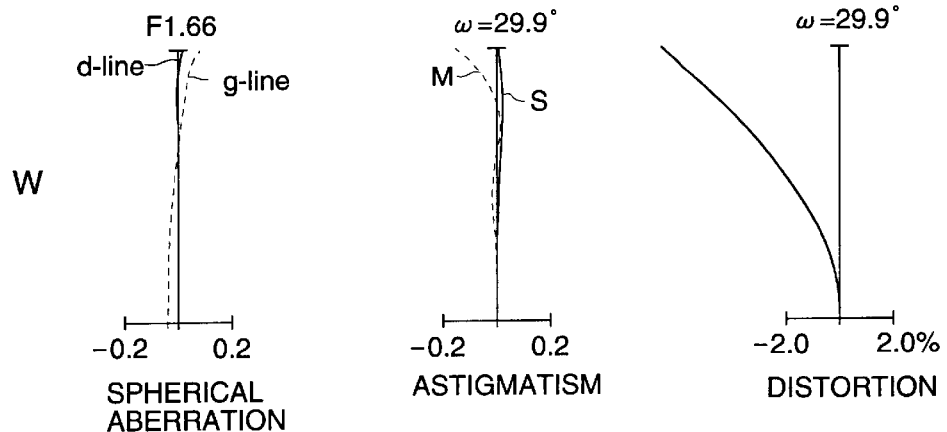
FIGS. 16(*a*)-1 to 16(*c*)-3 are views showing aberration of lenses in Example 8.
Figure 16:
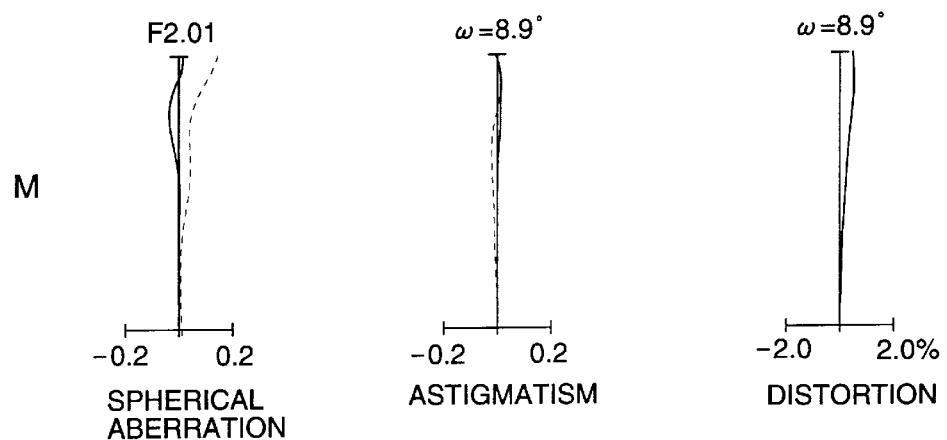
Figure 16:
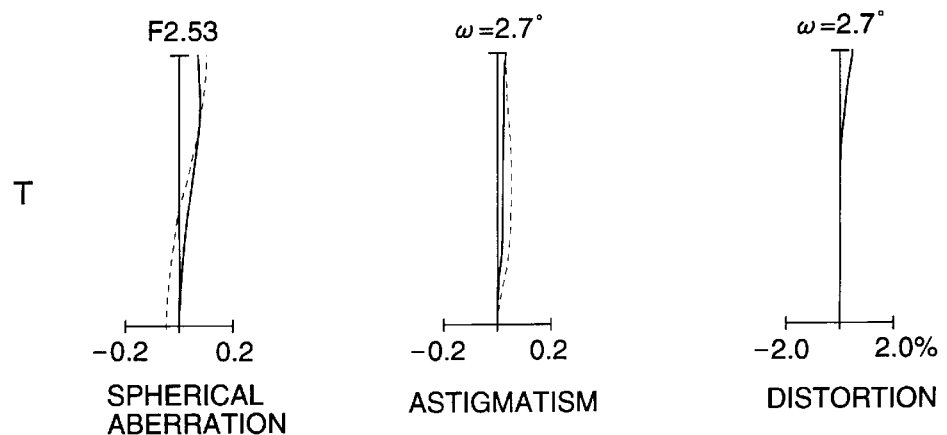
Figure 17:
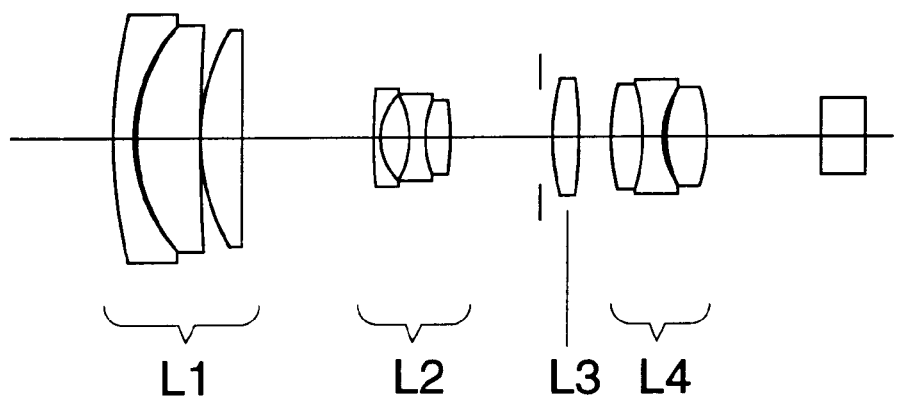
FIG. 17 is a sectional view of lenses in Example 9.
Figure 19:
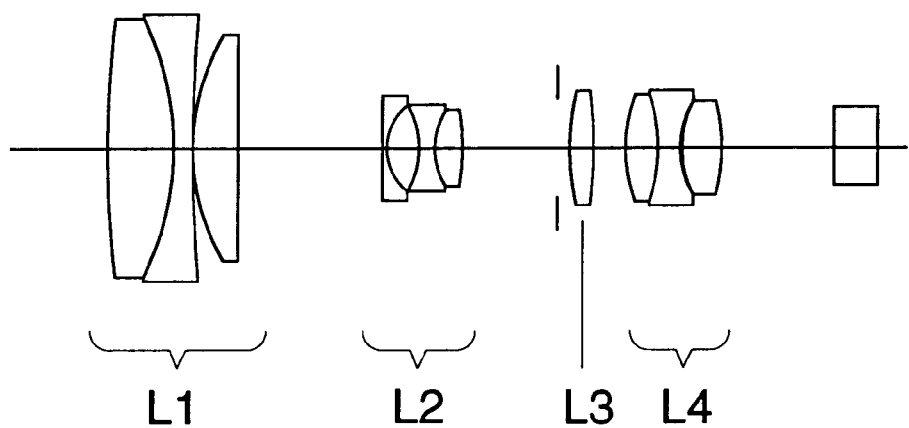
FIG. 19 is a sectional view of lenses in Example 10.
Figure 20:
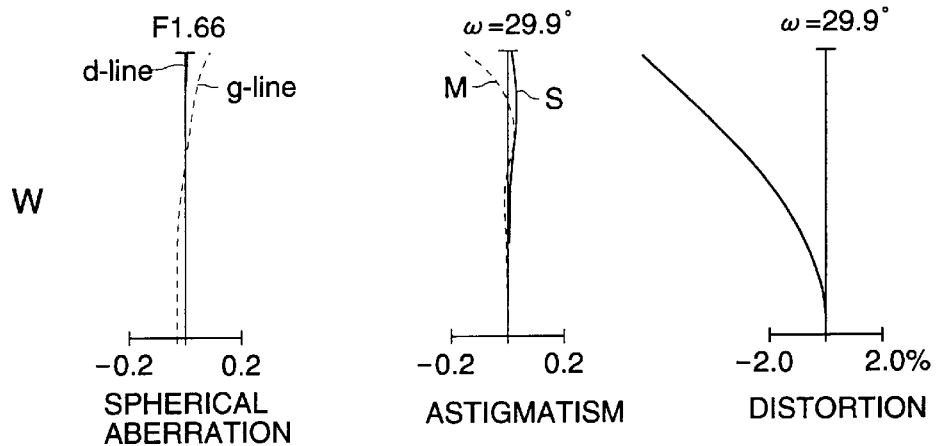
FIGS. 20(*a*)-1 to 20(*c*)-3 are views showing aberration of lenses in Example 10.
Figure 20:
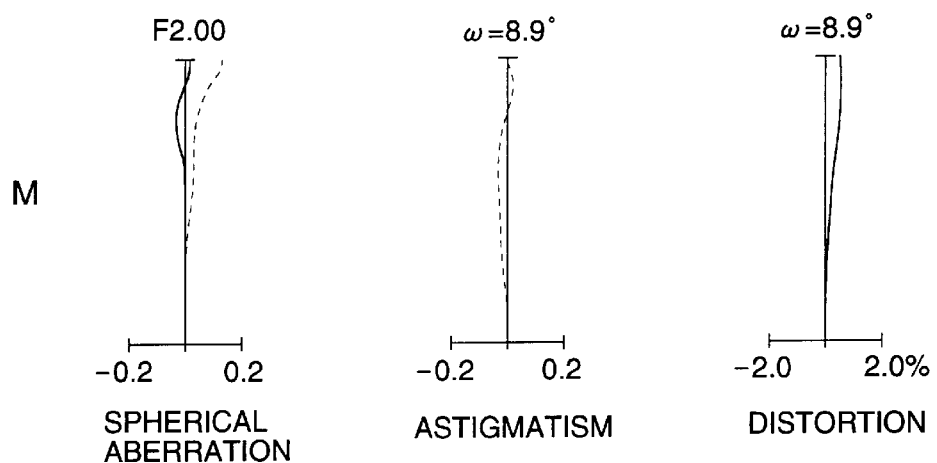
Figure 20:
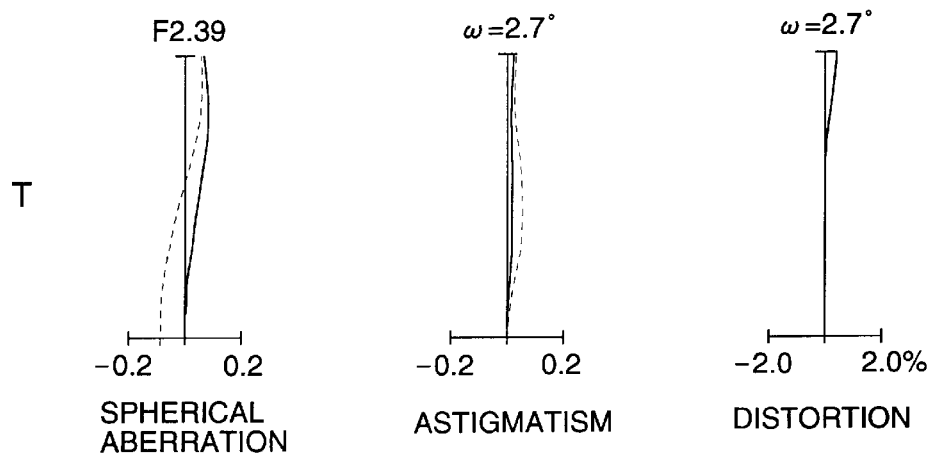

FIG. 9 is a sectional view of lenses in Example 5. FIGS. 10(a)-1 to 10(c)-3 are aberration curves of lenses in Example 5, and FIGS. 10(a)-1 to 10(a)-3 are aberration curves at the wide angle end, FIGS. 10(b)-1 to 10(b)-3 are those in the intermediate area, and 10(c)-1 to 10(c)-3 are those at the telephoto end. FIG. 11 is a sectional view of lenses in Example 6. FIGS. 12(a)-1 to 12(c)-3 are aberration curves of lenses in Example 6, and FIGS. 12(a)-1 to 12(a)-3 are aberration curves at the wide angle end, FIGS. 12(b)-1 to 12(b)-3 are those in the intermediate area, and 12(c)-1 to 12(c)-3 are those at the telephoto end. FIG. 13 is a sectional view of lenses in Example 7. FIGS. 14(a)-1 to 14(c)-3 are aberration curves of lenses in Example 7, and FIGS. 14(a)-1 to 14(a)-3 are aberration curves at the wide angle end, FIGS. 14(b)-1 to 14(b)-3 are those in the intermediate area, and 14(c)-1 to 14(c)-3 are those at the telephoto end. FIG. 15 is a sectional view of lenses in Example 8. FIGS. 16(a)-1 to 16(c)-3 are aberration curves of lenses in Example 8, and FIGS. 16(a)-1 to 16(a)-3 are aberration curves at the wide angle end, FIGS. 16(b)-1 to 16(b)-3 are those in the intermediate area, and 16(c)-1 to 16(c)-3 are those at the telephoto end. FIG. 17 is a sectional view of lenses in Example 9. FIGS. 18(a)-1 to 18(c)-3 are aberration curves of lenses in Example 9, and FIGS. 18(a)-1 to 18(a)-3 are aberration curves at the wide angle end, FIGS. 18(b)-1 to 18(b)-3 are those in the intermediate area, and 18(c)-1 to 18(c)-3 are those at the telephoto end. FIG. 19 is a sectional view of lenses in Example 10. FIGS. 20(a)-1 to 20(c)-3 are aberration curves of lenses in Example 10, and FIGS. 20(a)-1 to 20(a)-3 are aberration curves at the wide angle end, FIGS. 20(b)-1 to 20(b)-3 are those in the intermediate area, and 20(c)-1 to 20(c)-3 are those at the telephoto end. Symbols L1, L2, L3, and L4 shown in FIGS. 9, 11, 13, 15, 17, 19 respectively show the first, second, third, and fourth lens groups.

Incidentally, in Examples other than Example 9, the first lens in the first lens group, which is a plastic lens, and the second lens in the first lens group, which is a plastic lens, are cemented together. Further, in Examples 6, 7, 9, and 11, the first lens in the first lens group, which is a low dispersion plastic lens, and the second lens in the first lens group, which is a high dispersion plastic lens, are cemented together.

EXAMPLE 5

Focal length: f=4.59–52.92

F-number: F1.66–2.92

Angle of view: $2\omega$=56.2°–5.0°

TABLE 14

| Surface No. | r | d | $n_d$ | $v_d$ |
|---|---|---|---|---|
| 1  | 57.398   | 5.50 | 1.52470*1 | 56.0 |
| 2  | −29.272  | 1.50 | 1.58300*2 | 30.0 |
| 3  | 98.352   | 0.20 |           |      |
| 4  | 20.901   | 3.50 | 1.62299   | 58.2 |
| 5  | −750.168 | A    |           |      |
| 6  | 107.432  | 0.55 | 1.77250   | 49.6 |
| 7  | 5.084    | 2.75 |           |      |
| 8  | −7.591   | 1.00 | 1.49700*3 | 56.0 |
| 9  | 7.087    | 2.30 | 1.58300*2 | 30.0 |
| 10 | −23.452  | B    |           |      |
| 11 | 17.778   | 2.55 | 1.49700*3 | 56.0 |
| 12 | −42.863  | C    |           |      |
| 13 | 18.167   | 3.20 | 1.49700*3 | 56.0 |
| 14 | −16.636  | 1.50 | 1.58300*2 | 30.0 |
| 15 | 10.696   | 0.25 |           |      |
| 16 | 11.448   | 4.10 | 1.58913   | 61.2 |
| 17 | −17.879  | D    |           |      |
| 18 | ∞        | 4.48 | 1.51633   | 64.1 |
| 19 | ∞        |      |           |      |

TABLE 15

| | Aspherical coefficient | | Aspherical coefficient |
|---|---|---|---|
| 1st surface | $\kappa = 1.69160 \times 10^1$<br>$A_1 = 0$<br>$A_4 = 1.40470 \times 10^{-7}$<br>$A_6 = -3.60300 \times 10^{-8}$<br>$A_8 = 2.99340 \times 10^{-10}$<br>$A_{10} = -2.48610 \times 10^{-12}$<br>$A_{12} = -1.35710 \times 10^{-15}$ | 11th surface | $\kappa = -3.35040 \times 10^{-2}$<br>$A_0 = 0$<br>$A_4 = -5.24460 \times 10^{-4}$<br>$A_6 = 4.99900 \times 10^{-5}$<br>$A_8 = -2.57100 \times 10^{-6}$<br>$A_{10} = 6.48340 \times 10^{-8}$<br>$A_{12} = -6.34030 \times 10^{-10}$ |
| 3rd surface | $\kappa = 3.14300 \times 10^1$<br>$A_2 = 0$<br>$A_4 = 1.52700 \times 10^{-5}$<br>$A_6 = 5.11360 \times 10^{-9}$<br>$A_8 = 3.57330 \times 10^{-10}$<br>$A_{10} = -2.27070 \times 10^{-12}$<br>$A_{12} = 6.70920 \times 10^{-15}$ | 12th surface | $\kappa = -2.19300 \times 10^{-1}$<br>$A_1 = 6.43790 \times 10^{-6}$<br>$A_4 = -5.20420 \times 10^{-4}$<br>$A_6 = 5.54180 \times 10^{-5}$<br>$A_8 = -2.75530 \times 10^{-6}$<br>$A_{10} = 6.74250 \times 10^{-8}$<br>$A_{12} = -6.44190 \times 10^{-10}$ |
| 8th surface | $\kappa = -1.12650 \times 10^0$<br>$A_1 = 0$<br>$A_4 = 1.44610 \times 10^{-4}$<br>$A_6 = -3.51320 \times 10^{-6}$<br>$A_8 = -4.44430 \times 10^{-6}$<br>$A_{10} = 3.90890 \times 10^{-7}$<br>$A_{12} = -1.03120 \times 10^{-8}$ | 13th surface | $\kappa = 5.96260 \times 10^{-2}$<br>$A_1 = 0$<br>$A_4 = -8.88510 \times 10^{-5}$<br>$A_6 = 1.82250 \times 10^{-5}$<br>$A_8 = -9.51540 \times 10^{-7}$<br>$A_{10} = 2.18850 \times 10^{-8}$<br>$A_{12} = -1.97480 \times 10^{-10}$ |
| 10th surface | $\kappa = -1.19460 \times 10^{-2}$<br>$A_1 = 0$<br>$A_4 = 4.01450 \times 10^{-5}$<br>$A_6 = -3.95310 \times 10^{-6}$<br>$A_8 = -5.49740 \times 10^{-7}$<br>$A_{10} = 2.24830 \times 10^{-8}$ | 5th surface | $\kappa = -4.36400 \times 10^0$<br>$A_1 = 0$<br>$A_4 = 5.36810 \times 10^{-4}$<br>$A_6 = 8.84490 \times 10^{-6}$<br>$A_8 = -9.27240 \times 10^{-7}$<br>$A_{10} = 2.96870 \times 10^{-8}$<br>$A_{12} = -3.53420 \times 10^{-10}$ |

TABLE 16

| Variable interval | Focal length |
|---|---|
| A | 4.59 |
| B | 0.55 |
| C | 22.42 |
| D | 8.20 |
|   | 8.76 |
|   | 15.87 |
|   | 12.86 |
|   | 10.11 |
|   | 3.62 |
|   | 13.34 |
|   | 52.92 |
|   | 20.15 |
|   | 2.82 |
|   | 5.06 |
|   | 11.90 |

TABLE 17

The change of back focus at normal temperature +30° C.: $\Delta f_B$ value

| Focal length | $\Delta f_B$ |
|---|---|
| 4.59 | +0.052 |
| 15.87 | +0.029 |
| 52.92 | +0.018 |

$|fw \cdot \Sigma \{1/f_{p(1)}\}| = 0.00$
$|fw \cdot \Sigma \{1/f_{p(2)}\}| = 0.16$
$|fw \cdot \Sigma \{1/f_{p(3,i)}\}| = 0.01$

EXAMPLE 6

Focal length: f=4.59–52.92
F-number: F1.66–2.76
Angle of view: 2ω=56.0°–5.0°

TABLE 18

| Surface No. | r | d | $n_d$ | $v_d$ |
|---|---|---|---|---|
| 1 | 50.600 | 5.50 | 1.52470*1 | 56.0 |
| 2 | −30.702 | 1.50 | 1.58300*2 | 30.0 |
| 3 | 79.293 | 0.20 |  |  |
| 4 | 20.392 | 3.50 | 1.62299 | 58.2 |
| 5 | −415.082 | A |  |  |
| 6 | 63.888 | 0.55 | 1.77250 | 49.6 |
| 7 | 5.319 | 2.70 |  |  |
| 8 | −6.987 | 1.00 | 1.49700*3 | 56.0 |
| 9 | 5.819 | 2.30 | 1.58300*2 | 30.0 |
| 10 | −35.331 | B |  |  |
| 11 | 16.321 | 2.55 | 1.49700*3 | 56.0 |
| 12 | −39.845 | C |  |  |
| 13 | 16.859 | 3.20 | 1.49700*3 | 56.0 |
| 14 | −16.636 | 1.50 | 1.58300*2 | 30.0 |
| 15 | 9.744 | 0.35 |  |  |
| 16 | 12.820 | 4.10 | 1.58913 | 61.2 |
| 17 | −12.820 | D |  |  |
| 18 | ∞ | 4.48 | 1.51633 | 64.1 |
| 19 | ∞ |  |  |  |

TABLE 19

| | Aspherical coefficient | | Aspherical coefficient |
|---|---|---|---|
| 1st surface | $\kappa = 7.82770 \times 10^0$<br>$A_2 = 0$<br>$A_4 = 4.17950 \times 10^{-6}$<br>$A_6 = 2.32090 \times 10^{-8}$<br>$A_8 = -8.21950 \times 10^{-11}$<br>$A_{10} = 3.51610 \times 10^{-13}$<br>$A_{12} = -1.35710 \times 10^{-15}$ | 11th surface | $\kappa = 2.09080 \times 10^{-1}$<br>$A_2 = 0$<br>$A_4 = -5.69160 \times 10^{-4}$<br>$A_6 = 5.31130 \times 10^{-5}$<br>$A_8 = -2.62430 \times 10^{-6}$<br>$A_{10} = 6.52780 \times 10^{-8}$<br>$A_{12} = -6.53650 \times 10^{-10}$ |
| 3rd surface | $\kappa = 3.14390 \times 10^1$<br>$A_2 = 0$<br>$A_4 = 1.42020 \times 10^{-5}$<br>$A_6 = 5.95460 \times 10^{-9}$<br>$A_8 = 4.52140 \times 10^{-10}$<br>$A_{10} = -3.81740 \times 10^{-12}$<br>$A_{12} = 8.47670 \times 10^{-15}$ | 12th surface | $\kappa = -2.45760 \times 10^{-1}$<br>$A_2 = 6.43790 \times 10^{-6}$<br>$A_4 = -5.49090 \times 10^{-4}$<br>$A_6 = 5.61640 \times 10^{-5}$<br>$A_8 = -2.63390 \times 10^{-6}$<br>$A_{10} = 6.27520 \times 10^{-8}$<br>$A_{12} = -6.10980 \times 10^{-10}$ |
| 8th surface | $\kappa = -9.79280 \times 10^{-1}$<br>$A_2 = 0$<br>$A_4 = 6.74700 \times 10^{-5}$<br>$A_6 = -1.57080 \times 10^{-6}$<br>$A_8 = -4.29520 \times 10^{-6}$<br>$A_{10} = 3.83010 \times 10^{-7}$<br>$A_{12} = -1.07720 \times 10^{-8}$ | 13th surface | $\kappa = 4.48400 \times 10^{-1}$<br>$A_2 = 0$<br>$A_4 = -3.16780 \times 10^{-4}$<br>$A_6 = 2.29990 \times 10^{-5}$<br>$A_8 = -1.32470 \times 10^{-6}$<br>$A_{10} = 3.22380 \times 10^{-8}$<br>$A_{12} = -3.15760 \times 10^{-10}$ |
| 10th surface | $\kappa = -2.92560 \times 10^{-2}$<br>$A_2 = 0$<br>$A_4 = 1.25190 \times 10^{-4}$<br>$A_6 = -2.96480 \times 10^{-6}$<br>$A_8 = -2.01450 \times 10^{-7}$<br>$A_{10} = 1.66480 \times 10^{-8}$ | 15th surface | $\kappa = -4.06930 \times 10^0$<br>$A_2 = 0$<br>$A_4 = 4.61000 \times 10^{-4}$<br>$A_6 = 1.19660 \times 10^{-5}$<br>$A_8 = -1.36730 \times 10^{-6}$<br>$A_{10} = 4.54130 \times 10^{-8}$<br>$A_{12} = -5.60400 \times 10^{-10}$ |

TABLE 20

| | Variable interval | | | |
|---|---|---|---|---|
| Focal length | A | B | C | D |
| 4.59 | 0.55 | 20.32 | 7.75 | 7.90 |
| 15.96 | 12.24 | 8.63 | 3.38 | 12.27 |
| 52.92 | 19.15 | 1.72 | 5.37 | 10.28 |

TABLE 21

The change of back focus at normal temperature +30° C.: $\Delta f_B$ value

| Focal length | $\Delta f_B$ |
|---|---|
| 4.59 | +0.047 |
| 15.96 | +0.017 |
| 52.92 | −0.001 |

$|fw \cdot \Sigma \{1/f_{p(1)}\}| = 0.00$
$|fw \cdot \Sigma \{1/f_{p(2)}\}| = 0.21$
$|fw \cdot \Sigma \{1/f_{p(3,i)}\}| = 0.01$

EXAMPLE 7

Focal length: f=4.28–49.42
F-number: F1.66–2.53
Angle of view: 2ω=59.8°–5.4°

TABLE 22

| Surface No. | r | d | $n_d$ | $v_d$ |
|---|---|---|---|---|
| 1 | 73.376 | 2.00 | 1.58300*2 | 30.0 |
| 2 | 18.465 | 6.50 | 1.49700*3 | 56.0 |
| 3 | 267.738 | 0.20 |  |  |
| 4 | 21.765 | 4.20 | 1.60311 | 60.7 |
| 5 | −1961.821 | A |  |  |

TABLE 22-continued

| Surface No. | r | d | $n_d$ | $\nu_d$ |
|---|---|---|---|---|
| 6 | 79.651 | 0.55 | 1.77250 | 49.6 |
| 7 | 5.259 | 3.05 | | |
| 8 | −8.246 | 1.65 | 1.49700*3 | 56.0 |
| 9 | 8.513 | 2.60 | 1.58300*2 | 30.0 |
| 10 | −27.280 | B | | |
| 11 | 19.254 | 2.50 | 1.49700*3 | 56.0 |
| 12 | −41.687 | C | | |
| 13 | 17.308 | 3.40 | 1.49700*3 | 56.0 |
| 14 | −17.714 | 2.10 | 1.58300*2 | 30.0 |
| 15 | 9.933 | 0.30 | | |
| 16 | 10.888 | 4.10 | 1.58913 | 61.2 |
| 17 | −16.960 | D | | |
| 18 | ∞ | 4.48 | 1.51633 | 64.1 |
| 19 | ∞ | | | |

TABLE 23

| Aspherical coefficient | Aspherical coefficient |
|---|---|
| 1st surface $\kappa = 2.00040 \times 10^1$<br>$A_0 = 0$<br>$A_4 = -5.28680 \times 10^{-6}$<br>$A_6 = -3.75670 \times 10^{-8}$<br>$A_8 = 2.91080 \times 10^{-10}$<br>$A_{10} = -1.44570 \times 10^{-12}$<br>$A_{12} = 1.39080 \times 10^{-15}$ | 11th surface $\kappa = -1.05620 \times 10^{-1}$<br>$A_2 = 0$<br>$A_4 = -5.40500 \times 10^{-4}$<br>$A_6 = 5.06310 \times 10^{-5}$<br>$A_8 = -2.55010 \times 10^{-6}$<br>$A_{10} = 6.49280 \times 10^{-8}$<br>$A_{12} = -6.53380 \times 10^{-10}$ |
| 3rd surface $\kappa = 3.14850 \times 10^1$<br>$A_2 = 0$<br>$A_4 = 6.22070 \times 10^{-6}$<br>$A_6 = -2.03160 \times 10^{-8}$<br>$A_8 = 3.52770 \times 10^{-10}$<br>$A_{10} = -1.15230 \times 10^{-12}$<br>$A_{12} = 1.62960 \times 10^{-15}$ | 12th surface $\kappa = -2.44450 \times 10^{-1}$<br>$A_2 = 0$<br>$A_4 = -5.55910 \times 10^{-4}$<br>$A_6 = 5.71840 \times 10^{-5}$<br>$A_8 = -2.77510 \times 10^{-6}$<br>$A_{10} = 6.81600 \times 10^{-8}$<br>$A_{12} = -6.67650 \times 10^{-10}$ |
| 8th surface $\kappa = -6.04500 \times 10^{-1}$<br>$A_2 = 0$<br>$A_4 = 2.31970 \times 10^{-4}$<br>$A_6 = 6.63100 \times 10^{-6}$<br>$A_8 = -4.30100 \times 10^{-6}$<br>$A_{10} = 3.88670 \times 10^{-7}$<br>$A_{12} = -1.23870 \times 10^{-8}$ | 13th surface $\kappa = -5.81410 \times 10^{-2}$<br>$A_2 = 0$<br>$A_4 = -1.28300 \times 10^{-4}$<br>$A_6 = 1.99630 \times 10^{-5}$<br>$A_8 = -1.00750 \times 10^{-6}$<br>$A_{10} = 2.24500 \times 10^{-8}$<br>$A_{12} = -1.99070 \times 10^{-10}$ |
| 10th surface $\kappa = -6.63060 \times 10^{-2}$<br>$A_2 = 0$<br>$A_4 = 2.64550 \times 10^{-5}$<br>$A_6 = -4.12230 \times 10^{-6}$<br>$A_8 = -1.56720 \times 10^{-7}$<br>$A_{10} = 5.33450 \times 10^{-9}$ | 15th surface $\kappa = -4.16750 \times 10^0$<br>$A_2 = 0$<br>$A_4 = 5.93560 \times 10^{-4}$<br>$A_6 = 8.52820 \times 10^{-6}$<br>$A_8 = -9.72590 \times 10^{-7}$<br>$A_{10} = 3.17410 \times 10^{-8}$<br>$A_{12} = -3.89120 \times 10^{-10}$ |

TABLE 24

Variable interval

| Focal length | A | B | C | D |
|---|---|---|---|---|
| 4.28 | 0.60 | 23.87 | 7.41 | 8.04 |
| 14.54 | 13.83 | 10.64 | 3.40 | 12.05 |
| 49.42 | 21.65 | 2.82 | 4.18 | 11.27 |

TABLE 25

The change of back focus at normal temperature +30° C.: $\Delta f_B$ value

| Focal length | $\Delta f_B$ |
|---|---|
| 4.28 | +0.046 |
| 14.54 | +0.026 |
| 49.42 | +0.037 |

$|fw \cdot \Sigma \{1/f_{p(1)}\}| = 0.01$
$|fw \cdot \Sigma \{1/f_{p(2)}\}| = 0.15$
$|fw \cdot \Sigma \{1/f_{p(3,i)}\}| = 0.01$

EXAMPLE 8

Focal length: f=4.28–49.42
F-number: F1.66–2.53
Angle of view: 2ω=59.8°–5.4°

TABLE 26

| Surface No. | r | d | $n_d$ | $\nu_d$ |
|---|---|---|---|---|
| 1 | 88.502 | 6.70 | 1.51220*4 | 57.0 |
| 2 | −26.689 | 2.00 | 1.58300*2 | 30.0 |
| 3 | −1873.298 | 0.20 | | |
| 4 | 23.460 | 4.00 | 1.58913 | 61.2 |
| 5 | −498.501 | A | | |
| 6 | 79.651 | 0.55 | 1.77250 | 49.6 |
| 7 | 5.259 | 3.05 | | |
| 8 | −8.246 | 1.65 | 1.49700*3 | 56.0 |
| 9 | 8.513 | 2.60 | 1.58300*2 | 30.0 |
| 10 | −27.280 | B | | |
| 11 | 19.254 | 2.50 | 1.49700*3 | 56.0 |
| 12 | −41.687 | C | | |
| 13 | 17.308 | 3.40 | 1.49700*3 | 56.0 |
| 14 | −17.714 | 2.10 | 1.58300*2 | 30.0 |
| 15 | 9.933 | 0.30 | | |
| 16 | 10.888 | 4.10 | 1.58913 | 61.2 |
| 17 | −16.960 | D | | |
| 18 | ∞ | 4.48 | 1.51633 | 64.1 |
| 19 | ∞ | | | |

TABLE 27

| Aspherical coefficient | Aspherical coefficient |
|---|---|
| 1st surface $\kappa = 2.10540 \times 10^1$<br>$A_2 = 0$<br>$A_4 = 2.42970 \times 10^{-7}$<br>$A_6 = -2.26890 \times 10^{-8}$<br>$A_8 = 3.13450 \times 10^{-10}$<br>$A_{10} = -1.47720 \times 10^{-12}$<br>$A_{12} = 2.75070 \times 10^{-15}$ | 11th surface $\kappa = -1.05620 \times 10^{-1}$<br>$A_2 = 0$<br>$A_4 = -5.40500 \times 10^{-4}$<br>$A_6 = 5.06310 \times 10^{-5}$<br>$A_8 = -2.55010 \times 10^{-6}$<br>$A_{10} = 6.49280 \times 10^{-8}$<br>$A_{12} = -6.53380 \times 10^{-10}$ |
| 3rd surface $\kappa = 3.14910 \times 10^1$<br>$A_2 = 0$<br>$A_4 = 8.26900 \times 10^{-6}$<br>$A_6 = -1.45650 \times 10^{-8}$<br>$A_8 = 3.27430 \times 10^{-10}$<br>$A_{10} = -1.27350 \times 10^{-12}$<br>$A_{12} = 2.10020 \times 10^{-15}$ | 12th surface $\kappa = -2.44450 \times 10^{-1}$<br>$A_2 = 0$<br>$A_4 = -5.55910 \times 10^{-4}$<br>$A_6 = 5.71840 \times 10^{-5}$<br>$A_8 = -2.77510 \times 10^{-6}$<br>$A_{10} = 6.81600 \times 10^{-8}$<br>$A_{12} = -6.67650 \times 10^{-10}$ |
| 8th surface $\kappa = -6.04500 \times 10^{-1}$<br>$A_2 = 0$<br>$A_4 = 2.31970 \times 10^{-4}$<br>$A_6 = 6.63100 \times 10^{-6}$<br>$A_8 = -4.30100 \times 10^{-6}$<br>$A_{10} = 3.88670 \times 10^{-7}$<br>$A_{12} = -1.23870 \times 10^{-8}$ | 13th surface $\kappa = -5.81410 \times 10^{-2}$<br>$A_2 = 0$<br>$A_4 = -1.28300 \times 10^{-4}$<br>$A_6 = 1.99630 \times 10^{-5}$<br>$A_8 = -1.00750 \times 10^{-6}$<br>$A_{10} = 2.24500 \times 10^{-8}$<br>$A_{12} = -1.99070 \times 10^{-10}$ |
| 10th $\kappa = -6.63060 \times 10^{-2}$ | 15th $\kappa = -4.16750 \times 10^0$ |

TABLE 27-continued

| surface | Aspherical coefficient | surface | Aspherical coefficient |
|---|---|---|---|
| | $A_1 = 0$ | | $A_2 = 0$ |
| | $A_4 = 2.64550 \times 10^{-5}$ | | $A_4 = 5.93560 \times 10^{-4}$ |
| | $A_6 = -4.12230 \times 10^{-6}$ | | $A_6 = 8.52820 \times 10^{-6}$ |
| | $A_8 = -1.56720 \times 10^{-7}$ | | $A_8 = -9.72590 \times 10^{-7}$ |
| | $A_{10} = 5.33450 \times 10^{-9}$ | | $A_{10} = 3.17410 \times 10^{-8}$ |
| | | | $A_{12} = -3.89120 \times 10^{-10}$ |

TABLE 28

Variable interval

| Focal length | A | B | C | D |
|---|---|---|---|---|
| 4.28 | 0.60 | 23.87 | 7.41 | 8.04 |
| 14.54 | 13.83 | 10.64 | 3.40 | 12.05 |
| 49.42 | 21.65 | 2.82 | 4.18 | 11.27 |

TABLE 29

The change of back focus at normal temperature +30° C.:
$\Delta f_B$ value

| Focal length | $\Delta f_B$ |
|---|---|
| 4.28 | +0.045 |
| 14.54 | +0.022 |
| 49.42 | -0.012 |

$|fw \cdot \Sigma \{1/f_{p(1)}\}| = 0.01$
$|fw \cdot \Sigma \{1/f_{p(2)}\}| = 0.15$
$|fw \cdot \Sigma \{1/f_{p(3, i)}\}| = 0.01$

EXAMPLE 9

Focal length: f=4.28–49.46
F-number: F1.66–2.53
Angle of view: 2ω=59.2°–5.4°

TABLE 30

| Surface No. | r | d | $n_d$ | $\nu_d$ |
|---|---|---|---|---|
| 1 | 56.524 | 2.00 | 1.58300*2 | 30.0 |
| 2 | 17.052 | 0.30 | | |
| 3 | 17.723 | 6.50 | 1.49700*3 | 56.0 |
| 4 | 173.283 | 0.20 | | |
| 5 | 21.766 | 4.20 | 1.60311 | 60.7 |
| 6 | -2009.441 | A | | |
| 7 | 79.651 | 0.55 | 1.77250 | 49.6 |
| 8 | 5.259 | 3.05 | | |
| 9 | -8.246 | 1.65 | 1.49700*3 | 56.0 |
| 10 | 8.513 | 2.60 | 1.58300*2 | 30.0 |
| 11 | -27.280 | B | | |
| 12 | 19.254 | 2.50 | 1.49700*3 | 56.0 |
| 13 | -41.687 | C | | |
| 14 | 17.308 | 3.40 | 1.49700*3 | 56.0 |
| 15 | -17.714 | 2.10 | 1.58300*2 | 30.0 |
| 16 | 9.933 | 0.30 | | |
| 17 | 10.888 | 4.10 | 1.58913 | 61.2 |
| 18 | -16.960 | D | | |
| 19 | ∞ | 4.48 | 1.51633 | 64.1 |
| 20 | ∞ | | | |

TABLE 31

| surface | Aspherical coefficient | surface | Aspherical coefficient |
|---|---|---|---|
| 1st surface | $\kappa = 9.20470 \times 10^0$ | 12th surface | $\kappa = -1.05620 \times 10^{-1}$ |
| | $A_2 = 0$ | | $A_2 = 0$ |
| | $A_4 = -2.98060 \times 10^{-6}$ | | $A_4 = -5.40500 \times 10^{-4}$ |
| | $A_6 = -4.16820 \times 10^{-8}$ | | $A_6 = 5.06310 \times 10^{-5}$ |
| | $A_8 = 2.70550 \times 10^{-10}$ | | $A_8 = -2.55010 \times 10^{-6}$ |
| | $A_{10} = -9.45890 \times 10^{-13}$ | | $A_{10} = 6.49280 \times 10^{-8}$ |
| | $A_{12}\ 7.42810 \times 10^{-17}$ | | $A_{12} = -6.53380 \times 10^{-10}$ |
| 4th surface | $\kappa = 3.12980 \times 10^1$ | 13th surface | $\kappa = -2.44450 \times 10^{-1}$ |
| | $A_2 = 0$ | | $A_2 = 0$ |
| | $A_4 = 5.96490 \times 10^{-6}$ | | $A_4 = -5.55910 \times 10^{-4}$ |
| | $A_6 = -4.96930 \times 10^{-8}$ | | $A_6 = 5.71840 \times 10^{-5}$ |
| | $A_8 = 4.40660 \times 10^{-10}$ | | $A_8 = -2.77510 \times 10^{-6}$ |
| | $A_{10} = -1.29910 \times 10^{-12}$ | | $A_{10} = 6.81600 \times 10^{-8}$ |
| | $A_{12} = -2.14820 \times 10^{-15}$ | | $A_{12} = -6.67650 \times 10^{-10}$ |
| 9th surface | $\kappa = -6.04500 \times 10^{-1}$ | 14th surface | $\kappa = -5.81410 \times 10^{-2}$ |
| | $A_2 = 0$ | | $A_2 = 0$ |
| | $A_4 = 2.31970 \times 10^{-4}$ | | $A_4 = -1.28300 \times 10^{-4}$ |
| | $A_6 = 6.6310^{0 \times 10-6}$ | | $A_6 = 1.99630 \times 10^{-5}$ |
| | $A_8 = -4.3010^{0 \times 10-6}$ | | $A_8 = -1.00750 \times 10^{-6}$ |
| | $A_{10} = 3.88670 \times 10^{-7}$ | | $A_{10} = 2.24500 \times 10{-8}$ |
| | $A_{12} = -1.23870 \times 10^{-8}$ | | $A_{12} = -1.99070 \times 10^{-10}$ |
| 11th surface | $\kappa = -6.63060 \times 10^{-2}$ | 15th surface | $\kappa = -4.16750 \times 10^0$ |
| | $A_2 = 0$ | | $A_2 = 0$ |
| | $A_4 = 2.64550 \times 10^{-5}$ | | $A_4 = 5.93560 \times 10^{-4}$ |
| | $A_6 = -4.12230 \times 10^{-6}$ | | $A_6 = 8.52820 \times 10^{-6}$ |
| | $A_8 = -1.56720 \times 10^{-7}$ | | $A_8 = -9.72590 \times 10^{-7}$ |
| | $A_{10} = 5.33450 \times 10^{-9}$ | | $A_{10} = 3.17410 \times 10^{-8}$ |
| | | | $A_{12} = -3.89120 \times 10^{-10}$ |

TABLE 32

Variable interval

| Focal length | A | B | C | D |
|---|---|---|---|---|
| 4.28 | 0.60 | 23.87 | 7.41 | 8.04 |
| 14.55 | 13.83 | 10.64 | 3.40 | 12.04 |
| 49.46 | 21.65 | 2.82 | 4.19 | 11.25 |

TABLE 33

The change of back focus at normal temperature +30° C.:
$\Delta f_B$ value

| Focal length | $\Delta f_B$ |
|---|---|
| 4.28 | +0.046 |
| 14.55 | +0.026 |
| 49.46 | -0.041 |

$|fw \cdot \Sigma \{1/f_{p(1)}\}| = 0.01$
$|fw \cdot \Sigma \{1/f_{p(2)}\}| = 0.15$
$|fw \cdot \Sigma \{1/f_{p(3, i)}\}| = 0.01$

EXAMPLE 10

Focal length: f=4.28–49.47
F-number: F1.66–2.39
Angle of view: 2ω=59.8°–5.4°

TABLE 34

| Surface No. | r | d | $n_d$ | $\nu_d$ |
|---|---|---|---|---|
| 1 | 130.398 | 6.90 | 1.52470*1 | 56.0 |
| 2 | -29.159 | 2.00 | 1.58300*2 | 30.0 |
| 3 | 1342.071 | 0.20 | | |

TABLE 34-continued

| Surface No. | r | d | $n_d$ | $v_d$ |
|---|---|---|---|---|
| 4 | 24.371 | 4.50 | 1.60311 | 60.7 |
| 5 | −423.607 | A | | |
| 6 | 72.533 | 0.55 | 1.71300 | 53.9 |
| 7 | 5.337 | 3.35 | | |
| 8 | −8.268 | 1.65 | 1.49700*3 | 56.0 |
| 9 | 8.603 | 2.70 | 1.58300*2 | 30.0 |
| 10 | −28.810 | B | | |
| 11 | 20.448 | 2.50 | 1.49700*3 | 56.0 |
| 12 | −41.618 | C | | |
| 13 | 17.320 | 3.40 | 1.49700*3 | 56.0 |
| 14 | −17.714 | 2.10 | 1.58300*2 | 30.0 |
| 15 | 9.942 | 0.30 | | |
| 16 | 10.897 | 4.10 | 1.58913 | 61.2 |
| 17 | −16.975 | D | | |
| 18 | ∞ | 4.48 | 1.51633 | 64.1 |
| 19 | ∞ | | | |

TABLE 35

| | Aspherical coefficient | | Aspherical coefficient |
|---|---|---|---|
| 1st surface | $\kappa = 2.14460 \times 10^1$<br>$A_2 = 0$<br>$A_4 = 3.94740 \times 10^{-6}$<br>$A_6 = -1.52860 \times 10^{-8}$<br>$A_8 = 2.04710 \times 10^{-10}$<br>$A_{10} = -7.56630 \times 10^{-13}$<br>$A_{12} = 1.15350 \times 10^{-15}$ | 11th surface | $\kappa = -1.02840 \times 10^{-1}$<br>$A_1 = 0$<br>$A_4 = -5.39700 \times 10^{-4}$<br>$A_6 = 5.05500 \times 10^{-5}$<br>$A_8 = -2.54470 \times 10^{-6}$<br>$A_{10} = 6.49020 \times 10^{-8}$<br>$A_{12} = -6.57850 \times 10^{-10}$ |
| 3rd surface | $\kappa = 3.14850 \times 10^1$<br>$A_2 = 0$<br>$A_4 = 9.65540 \times 10^{-6}$<br>$A_6 = -1.15050 \times 10^{-8}$<br>$A_8 = 2.21930 \times 10^{-10}$<br>$A_{10} = -6.85650 \times 10^{-13}$<br>$A_{12} = 7.67880 \times 10^{-16}$ | 12th surface | $\kappa = -2.43700 \times 10^{-1}$<br>$A_2 = 0$<br>$A_4 = -5.60900 \times 10^{-4}$<br>$A_6 = 5.73830 \times 10^{-5}$<br>$A_8 = -2.77800 \times 10^{-6}$<br>$A_{10} = 6.81240 \times 10^{-8}$<br>$A_{12} = -6.69890 \times 10^{-10}$ |
| 8th surface | $\kappa = -8.36850 \times 10^{-1}$<br>$A_2 = 0$<br>$A_4 = 2.31970 \times 10^{-4}$<br>$A_6 = 6.20760 \times 10^{-6}$<br>$A_8 = -4.30100 \times 10^{-6}$<br>$A_{10} = 3.86300 \times 10^{-7}$<br>$A_{12} = -1.19710 \times 10^{-8}$ | 13th surface | $\kappa = -5.43750 \times 10^{-2}$<br>$A_2 = 0$<br>$A_4 = -1.27960 \times 10^{-4}$<br>$A_6 = 2.00240 \times 10^{-5}$<br>$A_8 = -1.01170 \times 10^{-6}$<br>$A_{10} = 2.23560 \times 10^{-8}$<br>$A_{12} = -1.95620 \times 10^{-10}$ |
| 10th surface | $\kappa = -6.84560 \times 10^{-2}$<br>$A_2 = 0$<br>$A_4 = 6.55630 \times 10^{-5}$<br>$A_6 = -4.40020 \times 10^{-6}$<br>$A_8 = -1.45310 \times 10^{-7}$<br>$A_{10} = 5.55040 \times 10^{-9}$ | 15th surface | $\kappa = -4.17320 \times 10^0$<br>$A_2 = 0$<br>$A_4 = 5.88090 \times 10^{-4}$<br>$A_6 = 8.51510 \times 10^{-6}$<br>$A_8 = -9.83690 \times 10^{-7}$<br>$A_{10} = 3.20330 \times 10^{-8}$<br>$A_{12} = -3.89120 \times 10^{-10}$ |

TABLE 36

| | Variable interval | | | |
|---|---|---|---|---|
| Focal length | A | B | C | D |
| 4.28 | 0.60 | 25.37 | 7.20 | 8.05 |
| 14.56 | 14.77 | 11.20 | 3.38 | 11.87 |
| 49.47 | 23.15 | 2.82 | 4.06 | 11.19 |

TABLE 37

The change of back focus at normal temperature +30° C.:
$\Delta f_B$ value

| Focal length | $\Delta f_B$ |
|---|---|
| 4.28 | +0.041 |
| 14.56 | +0.019 |
| 49.47 | −0.009 |

$|fw \cdot \Sigma \{1/f_{p(1)}\}| = 0.01$
$|fw \cdot \Sigma \{1/f_{p(2)}\}| = 0.15$
$|fw \cdot \Sigma \{1/f_{p(3, i)}\}| = 0.01$
$|r_2 / f_1| = 0.61$ The results of the foregoing show that in all Examples, there can be obtained a zoom lens having small aberration, the change in focal point due to temperature change is small and excellent optical performance with the zoom lens in which many plastic lenses are used. Incidentally, the distortion at wide angle end to the extent shown in the present Examples does not offer big problem.

According to the present invention, a zoom lens which is appropriate for still cameras or video cameras can be provided whose cost is greatly reduced compared to the conventional one by using many plastic lenses, even if the aperture ratio is high and variable magnification ratio is high. Moreover, it is possible to obtain the zoom lens which is not liable to be affected by temperature, even though many plastic lens are used thereby reducing the production cost thereof.

What is claimed is:

1. A zoom lens, comprising:

a plurality of lens groups having a lens group including a plurality of lenses and being provided closest to an object side, wherein the lens group has a first lens made of plastic having a positive refracting power and the first lens is located closest to the object side among the plurality of lenses in the lens group, wherein the lens group further includes a second lens made of plastic having a negative refracting power, which is Provided next to the first lens, and said first and second lenses are cemented together, wherein the lens group further includes a third lens provided closer than the second lens to an image side, and wherein the third lens is an organic glass lens having a positive refracting power.

2. The zoom lens of claim 1, wherein the cemented surface of the first and second lenses is concave to the object side.

3. The zoom lens of claim 1, wherein the second lens is made of high dispersion plastic.

4. The zoom lens of claim 1, wherein the first lens is made of low dispersion plastic.

5. The zoom lens of claim 4, wherein a surface on the object side of the first lens is formed by a hard coat.

6. The zoom lens of claim 1, wherein the lens group includes at least one lens having at least one aspherical surface thereon.

7. The zoom lens of claim 1, wherein the following conditions are satisfied:

$V_1-V_2>15$, $V_3>45$, and $0.5<|r_2/f_1|<1.2$ where $V_1$ represents an Abbe's number of the first lens of the lens group, $V_2$ represents an Abbe's number of the second lens of the lens group, $V_3$ represents an Abbe's number of the third lens of the lens group, $r_2$ represents a radius of curvature of the cemented surface between the first and second lenses of the lens group, and $f_1$ represents a focal length of the lens group.

8. A zoom lens, comprising:
(a) a first lens group having a positive refracting power and being provided closest to an object side;
(b) a second lens group having a negative refracting power and being provided between the first lens group and an image side lens group; and
(c) said image side lens group having a positive refracting power and being provided closest to an image side,
wherein the first lens group has a positive lens made of inorganic glass and all lenses other than the positive lens in the first lens group made of plastic, the second lens group has a negative lens made of inorganic glass and all lenses other than the negative lens in the second lens group made of plastic, and the image side lens group has a positive lens made of inorganic glass and all lenses other than the positive lens in the image side lens group made of plastic.

9. The zoom lens of claim 8, wherein the second lens group moves along an optical axis of the zoom lens to change magnification.

10. The zoom lens of claim 8, wherein the image side lens group moves to compensate for a positional change of a focus plane caused by a magnification change.

11. The zoom lens of claim 8, further comprising a third lens group having a positive refracting power and being provided between the second lens group and the image side lens group, the third lens group having all lenses made of plastic.

12. The zoom lens of claim 11, wherein the third lens group is a fixed lens group.

13. The zoom lens of claim 11, wherein the following conditions are satisfied:

$|fw \cdot \Sigma(1/f_{p(1)})|<0.10$, $|fw \cdot \Sigma(1/f_{p(2)})|<0.25$, and $|fw \cdot \Sigma(1/f_{p(3,i)})|<0.10$ where fw represents a focal length at a wide angle end of the zoom lens, $\Sigma(1/f_{p(1)})$ represents a sum of a reciprocal number of a focal length for each of the plastic lenses in the first lens group, $\Sigma(1/f_{p(2)})$ represents a sum of a reciprocal number of a focal length for each of the plastic lenses in the second lens group, and $\Sigma(1/f_{p(3,i)})$ represents a sum of a reciprocal number of a focal length for each of the plastic lenses in the image side lens group and the third lens group.

14. The zoom lens of claim 8, wherein the first lens group comprises one plastic lens having a positive refracting power, one plastic lens having a negative refracting power, and one inorganic glass lens having a positive refracting power.

15. The zoom lens of claim 8, wherein the second lens group comprises, in the order named from the object side, one negative lens made of inorganic glass in which a lens surface on the image side is concave and a curvature thereof is larger than that of a lens surface on the object side, one negative lens made of plastic, and one positive lens made of plastic, and wherein said negative and positive lenses made of plastic are cemented together.

16. The zoom lens of claim 8, the image side lens group comprises one positive lens made of plastic, one negative lens made of plastic, and one positive lens made of inorganic glass, and wherein said negative and positive lenses made of plastic are cemented together.

17. The zoom lens of claim 8, wherein the third lens group comprises one positive lens made of plastic.

18. A zoom lens, consisting essentially of:
(a) a first lens group having a positive refracting power and being provided closest to an object side;
(b) a second lens group having a negative refracting power and being provided between the first lens group and an image side lens group; and
(c) said image side lens group having a positive refracting power and being provided closest to an image side,
wherein the first lens group has a positive lens made of inorganic glass and all lenses other than the positive lens in the first lens group made of plastic, the second lens group has a negative lens made of inorganic glass and all lenses other than the negative lens in the second lens group made of plastic, and the image side lens group has a positive lens made of inorganic glass and all lenses other than the positive lens in the image side lens group made of plastic.

19. The zoom lens of claim 18, wherein the following conditions are satisfied:

$|fw \cdot \Sigma(1/f_{p(1)})|<0.10$, $|fw \cdot \Sigma(1/f_{p(2)})|<0.25$, and $|fw \cdot \Sigma(1/f_{p(i)})|<0.10$ where fw represents a focal length at a wide angle end of the zoom lens, $\Sigma(1/f_{p(1)})$ represents a sum of a reciprocal number of a focal length for each of the plastic lenses in the first lens group, $\Sigma(1/f_{p(2)})$ represents a sum of a reciprocal number of a focal length for each of the plastic lenses in the second lens group, and $\Sigma(1/f_{p(i)})$ represents a sum of a reciprocal number of a focal length for each of the plastic lenses in the image side lens group.

* * * * *